(12) United States Patent
Naito et al.

(10) Patent No.: US 6,197,399 B1
(45) Date of Patent: Mar. 6, 2001

(54) RECORDING MEDIUM AND METHOD OF MANUFACTURING THE SAME

(75) Inventors: Katsuyuki Naito, Tokyo; Takashi Ishino, Kawasaki; Hiroyuki Hieda, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/265,885

(22) Filed: Mar. 11, 1999

(30) Foreign Application Priority Data

Mar. 13, 1998 (JP) ................................. 10-062967
Dec. 22, 1998 (JP) ................................. 10-363706

(51) Int. Cl.$^7$ ........................................... B32B 3/02
(52) U.S. Cl. ...................... 428/64.1; 428/64.4; 428/64.5; 428/64.6; 428/913; 430/270.13; 430/270.14; 430/322; 430/945; 369/283; 369/288
(58) Field of Search ................. 428/64.1, 64.2, 428/64.4, 64.5, 64.8, 913; 430/270.13, 270.14, 495.1, 945, 321, 322; 369/283, 288

(56) References Cited

U.S. PATENT DOCUMENTS 5,591,501 * 1/1997 Ovshinsky ........................... 428/64.1
5,904,969 * 5/1999 Kamezaki et al. .................. 428/64.1

FOREIGN PATENT DOCUMENTS 7-254153  7/1995 (JP) .
8-45122   8/1996 (JP) .

OTHER PUBLICATIONS

E. Betzig et al., "Near field magneto–optics and high density data storage," Appl. Phys. Lett. 61 (2), Jul. 13, 1992, pp. 142–144.

S. Hosaka et al., "Scanning near–field optical microscope with a laser diode and nanometer–sized bit recording," Thin Solid Films 273, 1996, pp. 122–127.

L.C. Lenchyshyn et al., "Voltage–tuning in multi–color quantum well infrared photodetector stacks," J. Appl. Phys. 79 (10), May 15, 1996, pp. 8091–8097.

Chou;, "Patterned Magnetic Nanostructures and Quantized Magnetic Disks", Proceedings of the IEEE, vol. 85, No. 4, Apr. 1997, pp. 652–671.

Krauss et al.;, "Nano–Compact Disks With 400 Gbit/in$^2$ Storage Density Fabricated Using Nanoimprint Lithography and Read With Proximal Probe", Appl. Phys. Lett. 71 (21), Nov. 24, 1997, pp. 3174–3176.

Masuda et al.;, "Highly Ordered Nanochannel–Array Architecture In Anodic Alumina", Appl. Phys. Lett. 71 (19), Nov. 10, 1997, pp. 2770–2772.

* cited by examiner

Primary Examiner—Elizabeth Evans
(74) Attorney, Agent, or Firm—Finnegan, Henderson, Farabow, Garrett & Dunner, L.L.P.

(57) ABSTRACT

A recording medium comprising a hydrophilic film formed on a substrate, recording domains formed directly on the hydrophilic film so as to form a predetermined pattern, each recording domain being made of an organic dye molecule and having a size of 50 nm or less, and an isolation region surrounding the recording domains, the isolation region being made of an organic molecular film.

12 Claims, 3 Drawing Sheets

RECORDING MEDIUM AND METHOD OF MANUFACTURING THE SAME

BACKGROUND OF THE INVENTION

The present invention relates to a recording medium which is capable of realizing a high-density recording by means of light irradiation or electric charge injection, and to a method of manufacturing the recording medium.

It is desired in the latest information-oriented society to develop a recording and reproducing method and an apparatus which enable to achieve, in conformity with an increasing quantity of information, an extremely high recording density as compared with the conventional methods and apparatuses.

There are two kinds of technique for realizing optical recording, i.e., heat mode recording in which light is employed as heat, and photon mode recording in which light is employed as it is without being converted into heat. The heat mode recording is put into practical use in magneto-optical recording or in phase-change recording.

In order to improve the recording density by means of the heat mode recording, a technique employing a near-field scanning optical microscope (NSOM) which enables to form a microspot smaller than the wavelength of light has been proposed. For example, Betzig et al have succeeded to form recording spots having a size of 60 nm in an attempt to realize magneto-optical recording and reproducing of information by irradiating a Co/Pt multilayered film with an output of Ar ion laser through an NSOM probe (Appl. Phys. Lett., 61, 142 (1992)). Further, Hosaka et al have succeeded to form recording spots having a size of 50 nm by irradiating a 30 nm-thick $Ge_2Sb_2Te_5$ film with an output of a semiconductor laser through an NSOM probe so as to cause phase change in the film (Thin Solid Film, 273, 122 (1996); J. Appl. Phys., 79, 8092 (1996)). However, these methods are accompanied with problems that the recording spots are enlarged due to heat diffusion and that they require a large energy. Therefore, it is expected that these methods are not applicable to the realization of a recording density in the order of terabits/$cm^2$ where a recording spot size is required to be reduced to as small as about 10 nm.

Under the circumstances, the present inventors disclosed a recording medium which is capable of reading fluorescence by utilizing phase change in an organic dye molecule (Japanese Patent Unexamined Publication H7-254153). According to the recording medium, if an organic dye molecule having a low heat conductivity is employed, it is possible to greatly reduce the recording spot size. However, even with this method, it is still difficult to realize a recording density in the order of terabits/$cm^2$ where a spot size is required to be reduced to about 10 nm. Further, this recording medium is accompanied with problems that, since amorphous regions are brought into contact with a crystal region, the amorphous regions are likely to be crystallized, thus destroying the recorded data. Furthermore, since the phase change medium is constituted by a uniform medium, a difference in signal level between the crystal region and the amorphous region is relatively small, thus leading to increase in noise.

Likewise, a uniform medium for the photon mode recording employing a photochromic compound is also accompanied with the problem of noise.

On the other hand, Japanese Patent Unexamined Publication H8-45122 discloses a recording medium provided with dot-like recording domains having a size of 10 to 100 nm and comprising an organic dye molecule in which recording is performed by injecting an electric charge into the recording domains. Since a single dot constitutes a recording unit in the recording medium, it is possible to improve a recording density. However, this recording medium is accompanied with the problems that it is difficult to form recording dots, each constituting a recording unit, uniformly in size and position, and that the size and the position of the dot thus formed are likely altered with time. In addition, it is difficult to entirely flatten the recording medium.

As described above, no one has succeeded as yet to realize a practical recording medium capable of recording with a very high density in the order of terabits/$cm^2$.

BRIEF SUMMARY OF THE INVENTION

Therefore, an object of the present invention is to provide a recording medium and a manufacturing method thereof, which make it possible to ensure the stability of the recording domains, to reduce a noise level, and to easily flatten the entire surface of the recording medium.

According to the present invention, there is provided a recording medium, comprising a hydrophilic film formed on a substrate; recording domains formed directly on the hydrophilic film so as to make a predetermined pattern, each recording domain being made of an organic dye molecule and having a size of 50 nm or less; and an isolation region surrounding the recording domains, the isolation region being make of an organic molecular film.

According to the present invention, there is provided another recording medium, comprising an inorganic material film formed on a substrate; and recording domains buried in the inorganic material film so as to make a predetermined pattern, each recording domain being formed of a recording material selected from an organic dye molecule and an inorganic phase-change material and having a size of 50 nm or less.

The aforementioned recording media according to the present invention can be manufactured by various methods as explained below.

A first method comprises the steps of: forming a hydrophilic film on a substrate; forming an isolation region so as to expose regions having a size of 50 nm or less in the surface of the hydrophilic film with arranging the exposed regions into a predetermined pattern; and self-aggregating organic dye molecules selectively on the exposed regions of the hydrophilic film thereby forming recording domains.

A second method comprises the steps of: forming a hydrogen-terminated atomic film on a substrate; forming regions of a hydrophilic film on the hydrogen-terminated atomic film so as to form a predetermined pattern, each region having a size of 50 nm or less; self-aggregating organic dye molecules selectively on the regions of the hydrophilic film, thereby forming recording domains; forming another hydrophilic film in the region surrounding the recording domains; and forming an isolation region on the hydrophilic film in the region surrounding the recording domains, the isolation region being made of an organic molecular film.

A third method comprises the steps of: forming a hydrophilic film on a substrate; forming an organic dye molecular film on the hydrophilic film; patterning the organic dye molecular film so as to form a predetermined pattern, thereby forming recording domains having a size of 50 nm or less; and forming an isolation region on a region between the patterned recording domains made of the organic dye molecular film.

A fourth method comprises the steps of: forming an inorganic material film on a substrate; forming pits in the inorganic material film so as to form a predetermined pattern; filling the pits with a recording material selected from an organic dye molecule and an inorganic phase-change material; and removing an excessive recording material out of the pits.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
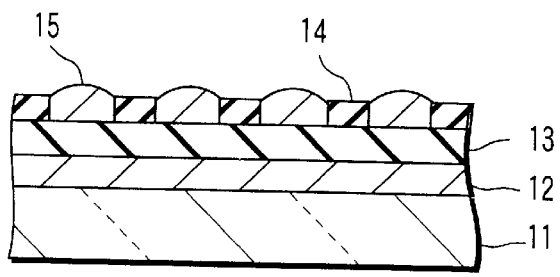
FIG. 1 is a cross-sectional view of the recording medium according to Example 1.

The recording medium according to the present invention has recording domains arranged so as to form a predetermined pattern, each recording domain being made of a recording material formed into a dot-like shape, in which recording and reproducing are performed by taking advantages of change in electric charge, fluorescence emission, phase change, and color change, etc., in the recording domains.

A first recording medium according to the present invention comprises a hydrophilic film formed on a substrate; recording domains formed directly on the hydrophilic film so as to make a predetermined pattern, each recording domain being made of an organic dye molecule and having a size of 50 nm or less; and an isolation region surrounding the recording domains, the isolation region being made of an organic molecular film. The term "hydrophilic film" means herein that the film is more hydrophilic than the dye molecule. Further, the "size of recording domain" means the size of the exposed region of each recording domain on the recording medium. Therefore, in the case where the exposed region is circular, it means the diameter thereof, while in the case where the exposed region is elliptic, it means the length of the minor axis thereof.

The dot-like recording domains each made of organic dye molecules and having a size of 50 nm or less may be periodically formed or into a specific pattern corresponding to recording bit information. These recording domains are formed directly on the hydrophilic film. Since the organic dye molecule generally has an aromatic ring, attractive force due to a hydrogen bond is acted between the organic dye molecule and the hydrophilic film. In addition, the recording domains are surrounded by an isolating region also formed directly on the hydrophilic film, the isolating region being made of an organic, generally insulating, molecular film. This organic molecular film should preferably be made of a polymer compound. The organic molecular film constituting the isolation region may be formed also on the upper surface of the recording domains so as to function as a protective film. The recording medium constructed in this manner according to the present invention can provide improved stability of the dot-like recording domains, in contrast with the conventional recording medium.

For example, in the case of a recording medium in which recording is performed by injecting an electric charge into recording domains made of an organic dye molecule, the electric charge injected into the recording domains can be retained stable without being dissipated, since the recording domains are surrounded by insulating organic molecular film. In the case of a recording medium comprising recording domains made of a phase change-type organic dye molecule, a recorded state of the recording domains can be maintained stable, since the recorded amorphous region is not surrounded by a crystal region of the same material, but is surrounded by an organic molecular film made of other material.

Further, the whole surface of the recording medium can be easily flattened by making the height of the organic dye molecule constituting the recording domains even with the height of the organic molecule film constituting the isolation region.

Accordingly, if the recording domains are formed into a periodically repeating pattern, the construction as well as the control of the apparatus employed for writing and reading can be simplified. Note that, if the recording domains are formed into a pattern in conformity with recording bit information, they can be used for a read-only recording medium (ROM).

The first recording medium of the present invention can be manufactured by various methods as described below.

A first method is described as follows. The first method comprises the steps of: forming a hydrophilic film on a substrate; forming an isolation region so as to expose regions having a size of 50 nm or less in the surface of the hydrophilic film with arranging the exposed regions into a predetermined pattern; and self-aggregating organic dye molecules selectively on the exposed regions of the hydrophilic film thereby forming recording domains.

In this method, a hydrophilic film is formed on a substrate at first. As for the substrate, there is not any particular restriction, so that glass, silicon, and a conductive film (a reflective film) such as Al can be used for the substrate. There is not any particular restriction with regard to the hydrophilic film if only it is highly hydrophilic as compared with the organic dye molecule, so that the hydrophilic film may be insulating or conductive. However, an insulating hydrophilic film such as $SiO_2$ is generally employed.

Next, an isolation region is formed so as to expose regions having a size of 50 nm or less in the surface of the hydrophilic film with arranging the exposed regions into a predetermined pattern. This can be achieved by a process in which a resist for constituting the isolation region is formed on the hydrophilic film, the resist is selectively irradiated with an energy beam, and then the resist is developed. The resist should be selected from materials whose surface energy differs greatly from that of the hydrophilic film. As for the energy beam, an electron beam, an X-ray, an ion beam, and a near-field beam may be employed, since they can be converged into a very small beam spot of 50 nm or less, more preferably 10 nm or less.

Alternatively, the isolation region can be formed by employing a method in which a resist for constituting the isolation region is formed on the hydrophilic film, and then, a stamp provided with patterned protrusions conforming with the pattern of the hydrophilic film to be exposed is pressed onto the resist so as to remove the regions of the resist which correspond to the protrusions of the stamp. In this method, the resist may be further subjected to an etching process by making use of an oxygen plasma after the stamp has been removed.

It is also possible to employ a method in which a stamp provided with pits corresponding to the pattern of the hydrophilic film to be exposed is coated with a hydrophobic compound and is pressed onto the hydrophilic film, so that the coated hydrophobic compound is transferred onto the hydrophilic film.

Thereafter, organic dye molecules are self-aggregated selectively on the exposed regions of the hydrophilic film thereby forming recording domains. The surface energy of the hydrophilic film is higher than the surface energy of the surrounding resist. Under the state, if an organic dye molecule film is formed by making use of a vapor deposition method or a coating method, the organic dye molecules having an aromatic ring are self-aggregated selectively on the hydrophilic film having a higher surface energy, thereby forming dot-like or droplet-like recording domains in conformity with the pattern of the exposed hydrophilic film. It is preferably in this case to raise the temperature of the organic dye molecule so as to facilitate the movement of the organic dye molecules. The size and the height of the recording domains can be determined depending on the quantity of the organic dye molecule.

Note that the shape of the hydrophilic film exhibiting a higher surface energy is not necessarily required to agree with the shape of the organic dye molecule completely. For example, the pattern of the hydrophilic film may be stripe-like, while the pattern of the organic dye molecule may be dot-like, which can be formed on the stripe pattern of the hydrophilic film by taking advantage of the cohesive force between the organic dye molecules. However, in view of the stability of recording domains, the shape of the organic dye molecules should preferably be the same as that of the hydrophilic film.

Next, a second method of manufacturing the first recording medium of the present invention will be explained. The second method comprises the steps of: forming a hydrogen-terminated atomic film on a substrate; forming regions of a hydrophilic film on the hydrogen-terminated atomic film so as to form a predetermined pattern, each region having a size of 50 nm or less; self-aggregating organic dye molecules selectively on the regions of the hydrophilic film, thereby forming recording domains; forming another hydrophilic film in the region surrounding the recording domains; and forming an isolation region on the hydrophilic film in the region surrounding the recording domains, the isolation region being made of an organic molecular film.

In this method, a hydrogen-terminated atomic film is formed on a substrate at first. As for the substrate, for instance, a silicon doped with an impurity can be employed. When a natural oxide film formed on the silicon layer is removed, the silicon layer will be terminated by hydrogen atoms.

Thereafter, regions of a hydrophilic film, each having a size of 50 nm or less, are formed on the hydrogen-terminated atomic film so as to form a predetermined pattern. This can be achieved by selectively irradiating the hydrogen-terminated atomic film with an energy beam, which is then stored in the air atmosphere. As a result, the energy beam-irradiated regions of the film are covered with a natural oxide film ($SiO_2$) within a short period of time to become hydrophilic and high in surface energy. On the other hand, the other region of the film which has not been irradiated with the energy beam is still hydrophobic. As for the energy beam, those which can be converged in beam size to 50 nm or less, more preferably 10 nm or less, such as an electronic beam, X-rays, an ion beam, a near field, etc., may be employed.

The pattern of the hydrophilic film can also be formed by making use of a stamp on which a hydrophilic material is coated so as to form a predetermined pattern, and then pressing the stamp onto the hydrogen-terminated atomic film to transfer the pattern of the hydrophilic material.

Alternatively, the hydrogen-terminated atomic film may be selectively irradiated with an energy beam in the presence of an aldehyde derivative having a hydrophilic group at the terminal thereof, thereby allowing the film to react with the aldehyde derivative to form a hydrophilic film having a terminal hydrophilic group. Namely, when the hydrogen-terminated atomic film is irradiated with a ultraviolet near-field beam in the presence of a compound having aldehyde group, a reaction takes place between the irradiated regions of silicon surface and the aldehyde group thereby forming a chemical bond therebetween. If a hydrophilic group such as hydroxyl group is introduced into one of the terminals of aldehyde compound which is opposite to the terminal aldehyde group is located, the ultraviolet-irradiated region of the film can be made hydrophilic, while the unirradiated region is being kept hydrophobic.

On the other hand, if a hydrophobic group is introduced into one of the terminals of aldehyde compound which is opposite to the terminal aldehyde group is located, the silicon surface is entirely hydrophobic immediately after the irradiation of ultraviolet rays. However, when the silicon surface is subsequently heated in an oxidizing atmosphere, a region of silicon surface where the aldehyde compound is not bonded is oxidized, thereby causing the region unirradiated with ultraviolet rays to become hydrophilic, while the irradiated region is being kept hydrophobic.

When a thin natural oxide film (hydrophilic film) is formed as mentioned above, the surface can be made very flat. Under this condition, an organic dye molecules are self-aggregated selectively on the patterned hydrophilic film, thereby forming the recording domains. Thereafter, a hydrophilic film is formed at the region surrounding the recording domains. For example, when the silicon substrate is left to stand for one day or so in an air atmosphere, a hydrophilic natural oxide film is formed also on the surface around the recording domains where the hydrogen-terminated atomic film is left remained. Then, an isolation region comprising an organic molecular film is formed on the hydrophilic film formed on the region surrounding the recording domains. The formation of the isolation region composed of an organic molecular film can be performed in a most simple manner, i.e., by spin-coating a solution of a polymer compound on the region surrounding the recording domains. In this case, a polymer film is often formed also on the recording domains composed of organic dye molecules.

Next, a third method of manufacturing the first recording medium of the present invention will be explained. The third method comprises the steps of: forming a hydrophilic film on a substrate; forming an organic dye molecular film on the hydrophilic film; patterning the organic dye molecular film so as to form a predetermined pattern, thereby forming recording domains having a size of 50 nm or less; and forming an isolation region on a region between the patterned recording domains made of the organic dye molecular film.

In this method, a hydrophilic film and an organic dye molecule film are formed on a substrate at first. Then, the organic dye molecular film is patterned so as to form a predetermined pattern, thereby forming recording domains each having a size of 50 nm or less. This can be achieved by a process in which a stamp provided with patterned protrusions corresponding with the pattern to be formed is pressed onto the organic dye molecule film so as to remove the regions of the organic dye molecule film which correspond to the protrusions of the stamp, thereby forming the recording domains each having a size of 50 nm or less. In this method, the organic dye molecule film may be further subjected to an etching process by oxygen plasma after the stamp has been removed. Thereafter, an isolation region is formed between the domains of the organic dye molecular film. This can be achieved, for example, by spin-coating a solution of a polymer compound, thereby forming the isolation region formed of an organic molecule film.

A second recording medium according to the present invention comprises an inorganic material film formed on a substrate; and recording domains buried in the inorganic material film so as to make a predetermined pattern, each recording domain being formed of a recording material selected from an organic dye molecule and an inorganic phase-change material and having a size of 50 nm or less.

There is not any particular limitation with regard to the substrate employed in this case. Any underlying film may be interposed between the substrate and the inorganic material film. If an underlying film is employed, the film may be either hydrophilic or hydrophobic.

According to the structure of this recording medium, the recording domains, each formed of a recording material selected from an organic dye molecule and an inorganic phase-change material and having a size of 50 nm or less, are surrounded by an isolation region consisting of an inorganic material film. It is also possible according to this recording medium to obtain almost the same effects as obtainable in the first recording medium of the, present invention.

This second recording medium according to the present invention can be manufactured by the following method.

Namely, this method comprises the steps of:

forming an inorganic material film on a substrate;

forming pits in the inorganic material film so as to form a predetermined pattern; filling the pits with a recording material selected from an organic dye molecule and an inorganic phase-change material;

and removing an excessive recording material out of the pits.

In this method, an inorganic material film such as an $SiO_2$ film is formed on a substrate. The formation of this inorganic material film can be achieved by making use of an ordinary method, e.g., a dry method such as vacuum deposition and sputtering, or a wet method such as a sol-gel method.

Then, a predetermined pattern of pits is formed in the inorganic material film. This can be achieved by a method in which a resist is coated on an inorganic material film, is subjected to exposure using an electron beam, an ion beam, an near-field beam, etc., and is developed to form a resist pattern, after which the inorganic material film is etched with the resist pattern being employed as a mask.

Alternatively, the inorganic material film formed of alumina, etc., and provided with a predetermined pattern of pits may be manufactured by a method in which a metal film such as an aluminum film is formed on the substrate, and then, a stamp provided with a pattern of protrusions corresponding to the pattern to be formed is pressed onto the metal film thereby to form flaws of the protrusions in the metal film, the metal film being subsequently subjected to oxidation and to electrochemical etching of the applied regions, thereby forming the aforementioned inorganic material film provided with a predetermined pattern of pits. This method is advantageous in terms of the manufacturing cost.

The pits formed in the inorganic material film is filled with a recording material. As for the method of filling the pits with recording material, a dry method such as vacuum deposition, a solvent casting method, a melting method, etc., can be employed. Among these methods, the melting method is most preferable. If the melting method is employed, the recording material should preferably be selected from those having melting point less than the melting point of the inorganic material film, more preferably 100° C. or less, and being free from denaturing even if the recording material is heated higher than the melting point. When the pits are filled with a recording material, it should preferably be performed in vacuum. It is preferable in this case, in view of facilitating the filling of the recording material into the pits, to select an inorganic material which is hydrophilic and high in surface energy.

Subsequently, an excessive recording material is removed out of the pits. The removal of the excessive recording material can be performed by means of etching using plasma or a solvent. However, the employment of mechanical methods such as centrifugal separation or polishing is more preferable.

Specifically, after the pits formed in an inorganic material film are filled with a melted recording material while being kept in a melted state, the substrate is rotated so as to remove an excessive recording material by the effect of centrifugal force. Alternatively, an excessive recording material can be removed by polishing after the pits formed in an inorganic material film are filled with a melted recording material. In this latter case, the inorganic material film is required to be higher in hardness than that of the recording material. Further, this polishing should preferably be performed under a condition where the recording material is softened by heating.

According to the recording medium of the present invention, the size of each recording domain is required to be 50 nm or less, and at the same time, the average distance between the adjacent recording domains should preferably be not more than one third (⅓) of the size of the recording domain. More specifically, the size of each recording domain should preferably be 10 nm or less, and the average distance between the adjacent recording domains should preferably be 3 nm or less. By the way, in view of controllability in the manufacturing the recording medium, the lower limit in size of the recording domain should preferably be 1 nm or more. As long as the distance between the adjacent recording domains meets the aforementioned condition, the recording domains can be faultlessly overlapped by the recording probe, thus making it possible to reduce recording errors. Further, the provision of a signal control region in the midway of recording domains for the purpose of loading an address information thereon is also effective in minimizing recording errors.

The organic dye molecule and inorganic phase-change material employed as a recording material in the present invention may be suitably selected depending on the recording method. Also, the specific structure of the recording medium can be suitably selected depending on the recording method.

For example, in the method where the recording is performed by injection of an electric charge into the recording domains, a donor or an acceptor organic dye molecule can be employed. In this recording method, if a silicon doped with an impurity is employed as the substrate, an image electric charge having a polarity opposite to that of the electric charge injected into the recording domains made of the organic dye molecules is formed in the silicon substrate due to its low electric resistance, thereby stabilizing the injected electric charge. Further, since the natural oxide film formed on the silicon substrate is flat and excellent in uniformity, it is convenient for the manufacture of a recording medium.

In the method where the recording is performed by injection of an electric charge into the recording domains and the reproducing is performed by taking advantage of changes in intensity of fluorescence emitted from the recording domains, a dye molecule capable of exhibiting a high fluorescence intensity can be employed. Since the fluorescence can be detected with a very high sensitivity, this method is preferable for the manufacture of a very high density recording medium.

If a protective film is formed on the recording medium in which recording is performed by injection of an electric charge into the recording domains, the protective film should preferably be selected from those exhibiting conductivity. By the way, it is also possible to make the insulating film thinner thereby allowing a tunnel injection of the electric charge to take place.

In the method where recording is performed by taking advantage of phase-change between the crystal phase and the amorphous phase of the recording domains, an organic dye molecule or an inorganic phase-change material exhibiting a high crystallization rate can be employed. When a phase-change material is employed, it is possible to expect a prominent improvement in stability of the recording due to the fact that the recorded amorphous regions are surrounded by a crystalline region which is not formed of the same material as that of the amorphous region. Further, since the optical characteristics of the recording domains (an organic dye molecule or an inorganic phase-change material) can be differentiated from those of the surrounding isolation region, it is possible to enhance the contrast and to reduce the signal noise.

In the method where recording is performed by irradiation of light into the recording domains and reproducing is performed by taking advantage of changes in absorption, an organic dye molecule exhibiting a photochromic property can be employed. It is also possible, when the photochromic compound is used, to reduce the signal noise as in the case of the aforementioned phase-change material.

In any of the aforementioned organic dye molecules, it is preferable that they exhibit a glass transition temperature of 25° C. or more, preferably 80° C. or more, and can easily form an amorphous phase. An organic dye molecule having a high glass transition temperature can be uniformly adsorbed onto a hydrophilic film exhibiting high surface energy, and can be easily formed into a droplet-like dot structure scarcely exhibiting anisotropy. On the contrary, a highly crystallizable organic dye molecule cannot be uniformly adsorbed onto a hydrophilic film, and can hardly be formed into a dot-like structure.

Examples of organic dye molecule used in the present invention are described more specifically below.

As for the donor type or acceptor type organic dye molecules, the compounds represented by the following general formula can preferably be employed.

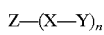

where Z is an aromatic skeleton or an alicyclic skeleton; Y is a molecular skeleton exhibiting a donor or acceptor property; X is a linkage group; and n is an integer of 1 or more. If n is 3 or more, the organic dye molecule can likely be stable amorphous state with a glass transition temperature of 25° C. or more.

Specific examples of Y, Z and X are shown below. The molecular skeletons (D1) to (D7) of Y exhibit donor properties, while the molecular skeletons (A1) to (A5) of Y exhibit acceptor properties. Examples of the central skeleton Z are represented by (Z1) to (Z58). Various kinds of linking group can be employed as X.

(D1) fulvalene type donor

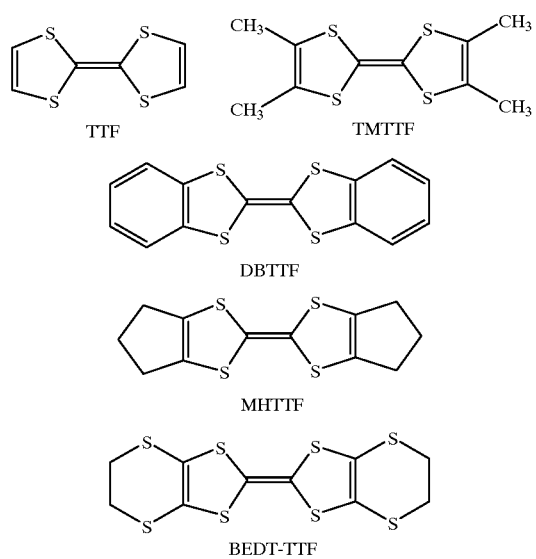

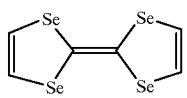
TSF

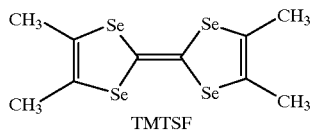
TMTSF

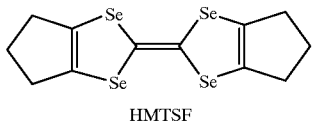
HMTSF

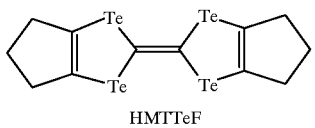
HMTTeF (D2) sulfur-containing heterocyclic donor

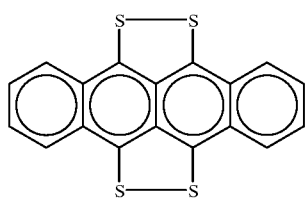
tetrathiotetracene (TTT)    tetrathionaphthalene

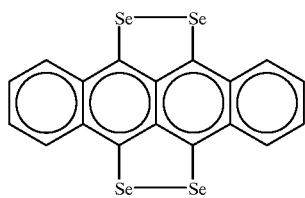
tetraselenotetracene (TST)

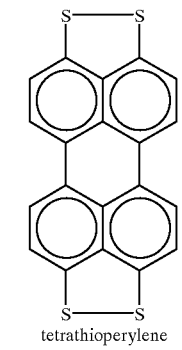
tetrathioperylene

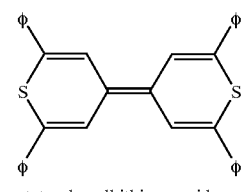
tetraphenylbithiopyranidene

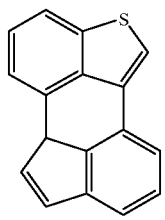
bibenzothiophene (BBT)

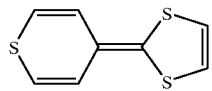

[φ represents a phenyl group.]

(D3) amine-type donor

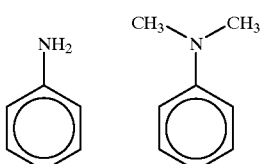
aniline    N-methylaniline    P-phenylenediamine

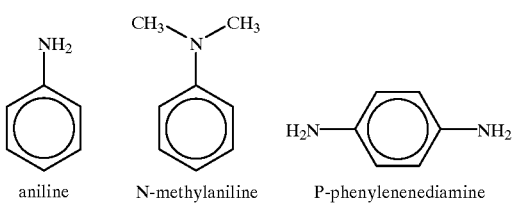
TMPD    diaminonaphthalene

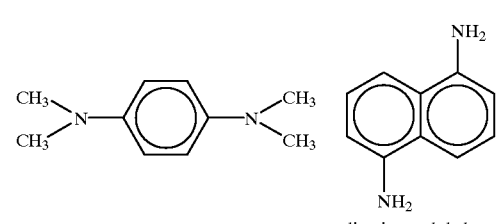
benzidine

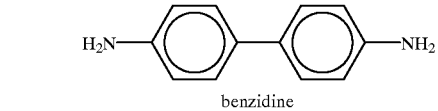
tetramethylbenzidine

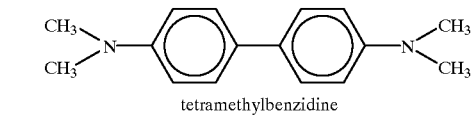
diaminopyrene

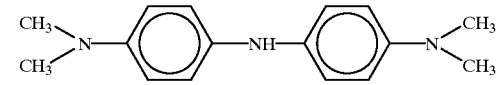

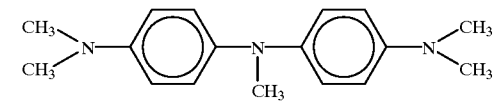

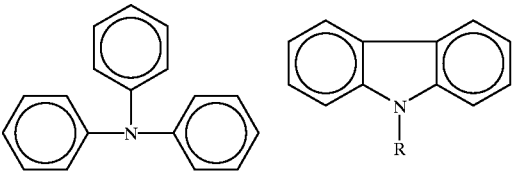

[R represents a hydrogen atom or alkyl group.]

-continued
(D4) metal complex-type donor
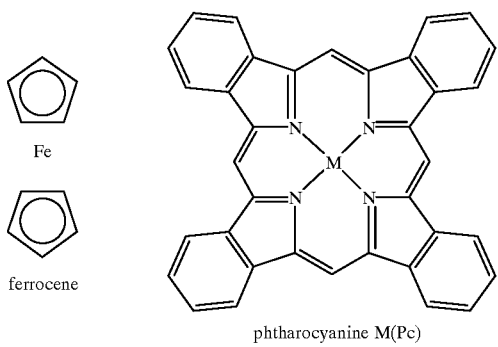
ferrocene    phtharocyanine M(Pc)
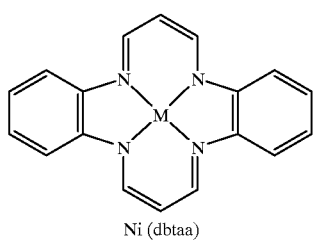
Ni (dbtaa)
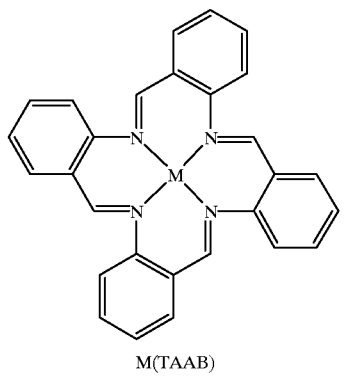
M(TAAB)
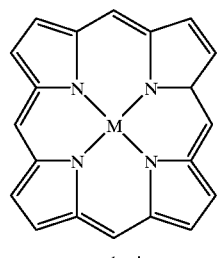 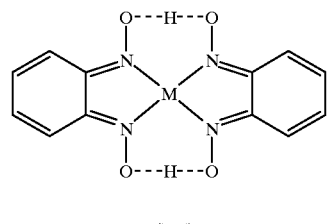
porphyrin    M(bqd)$_2$
[M represents a metal atom.]
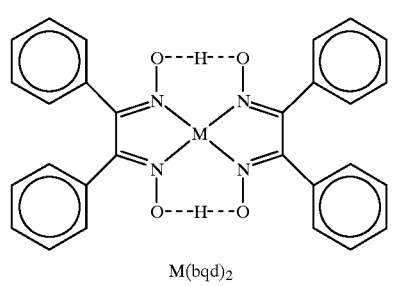
M(bqd)$_2$
-continued
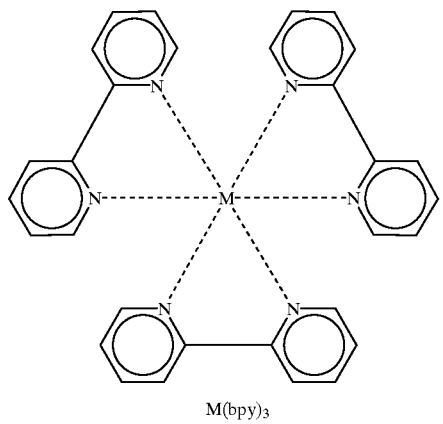
M(bpy)$_3$
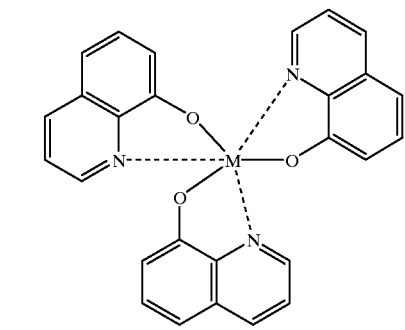
[M represents a metal atom.]
(D5) cyanine dye donor
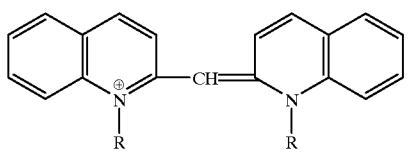
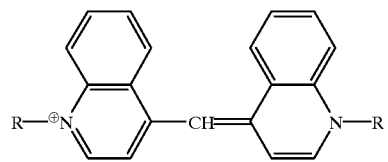
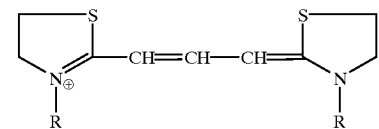
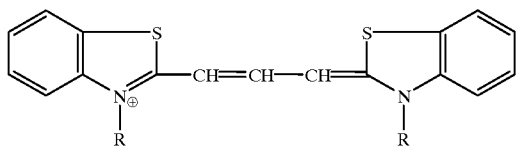
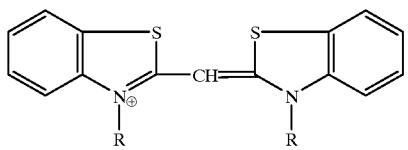

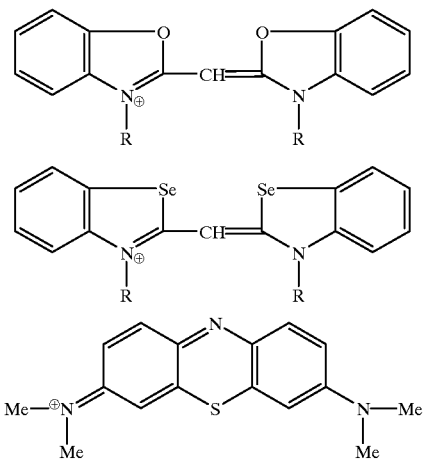
[Me represents a methyl group, and R represents a hydrogen atom a hydrogen atom or alkyl group.]
(D6) nitrogen-containing heterocyclic donor
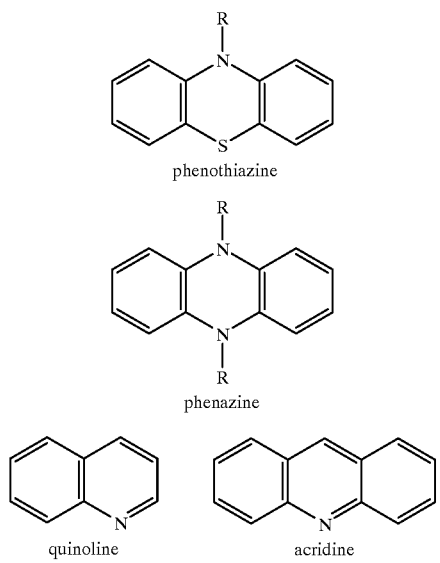
(D7) polymer-type donor
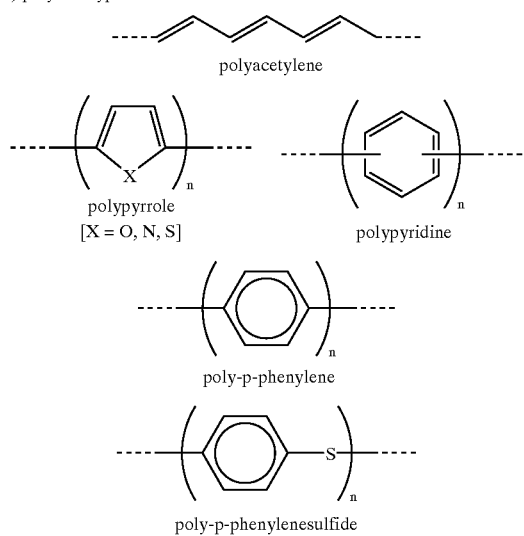
(A1) cyano compound-type acceptor
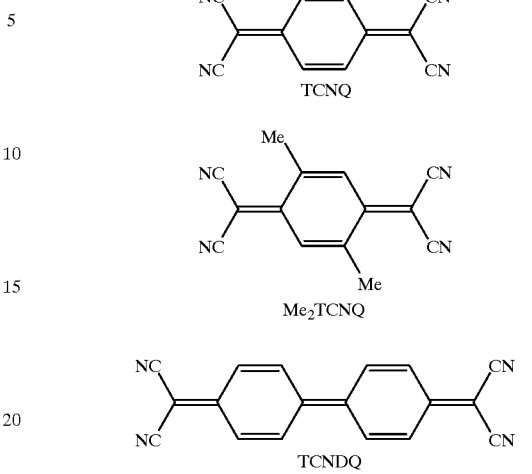
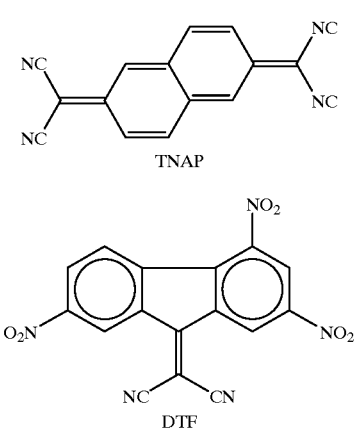
DTF
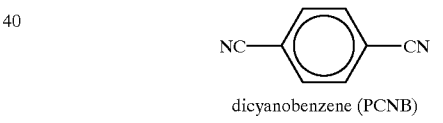
dicyanobenzene (PCNB)
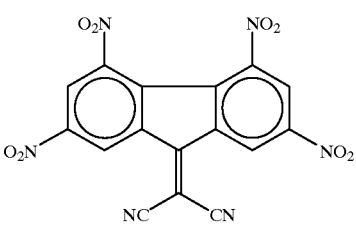
(A2) quinone-type acceptor
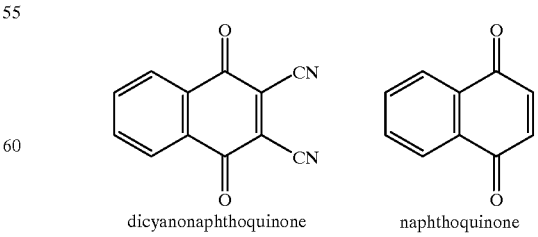
dicyanonaphthoquinone    naphthoquinone -continued 2,3-dichloronaphthoquinone (Each of R¹–R⁴ represents a hydrogen atom, halogen atom, alkyl group alkenyl group, aryl group, alkyloxy group, alkythio group, alkylthio group, alkyloxycarbonyl group, cyano group, nitro group, hydroxyl group, animo group, carboxyl group, acetyl group or formal group.)

(A3) nitro compound-type acceptor p-nitrocyanobenzene 1, 3-dinitrobenzene

TNF 1, 3, 5-trinitrobenzene p-dinitrobenzene (A4) quinodiimine-type acceptor (Each of R⁵–R⁸ represents a hydrogen atom, halogen atom, alkyl group, alkenyl group, aryl group, alkyloxy group, alkylthio group, alkyloxycarbonyl group, cyano group, nitro group, hydroxyl group, amino group, carboxyl group, acetyl group or formyl group.)

(A5) viologen-type acceptor (R represents an alkyl group or arly group.)

Examples of Z in the general formula Z-(X–Y)$_n$ (Z-1)

(Z-2)

(Z-3)

(Z-4)

(Z-5)

(Z-6)

(Z-7)

(Z-8)

(Z-9)

-continued
(Z-10) 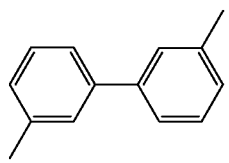
(Z-11) 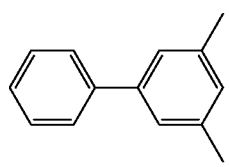
(Z-12) 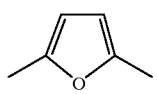
(Z-13) 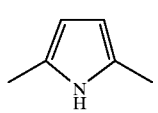
(Z-14) 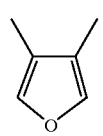
(Z-15) 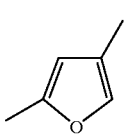
(Z-16) 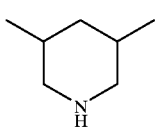
(Z-17) 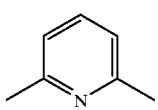
(Z-18) 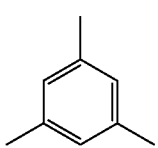
(Z-19) 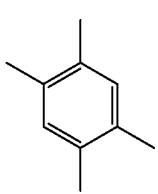
-continued
(Z-20) 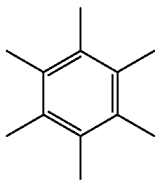
(Z-21) 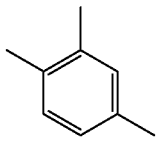
(Z-22) 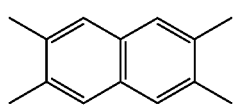
(Z-23) 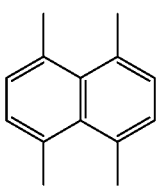
(Z-24) 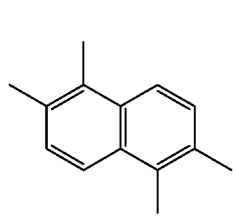
(Z-25) 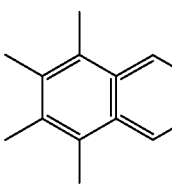
(Z-26) 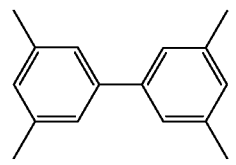
(Z-27)

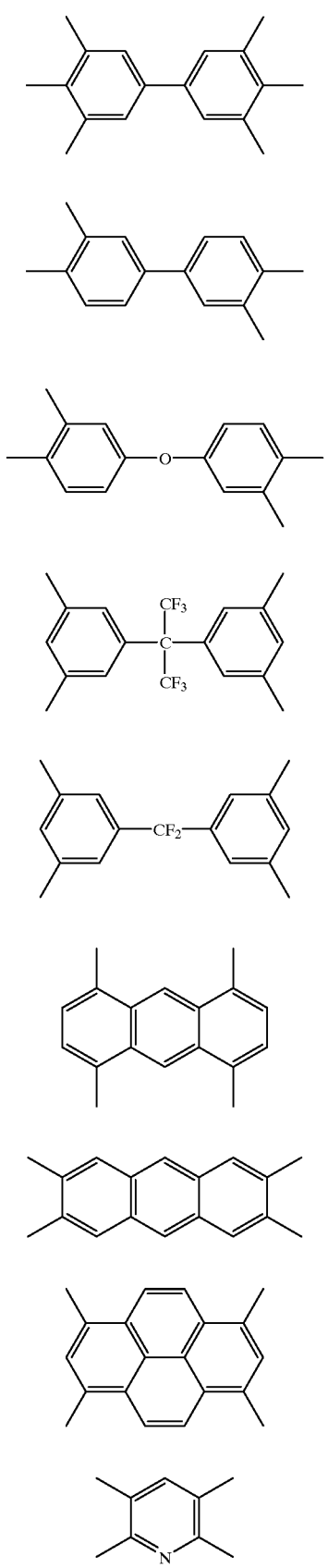
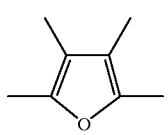
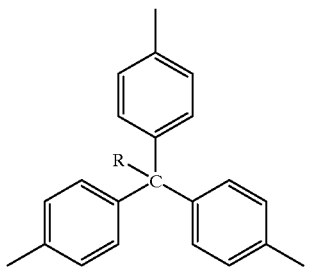
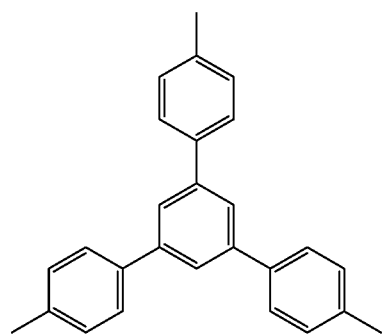
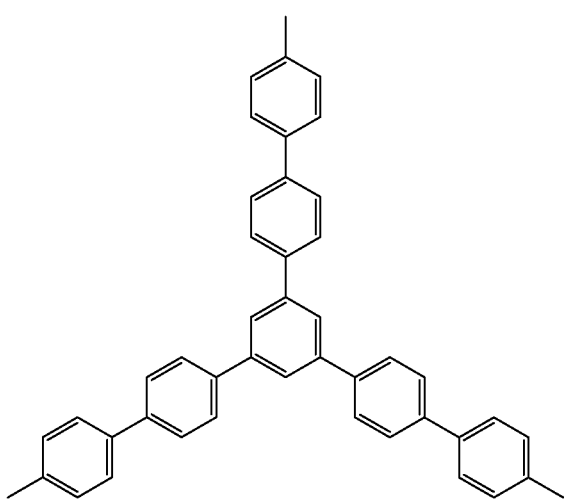
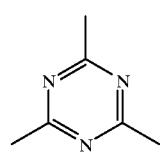

(Z-42) 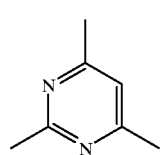
(Z-43) 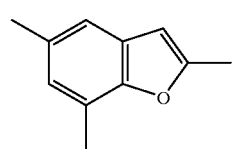
(Z-44) 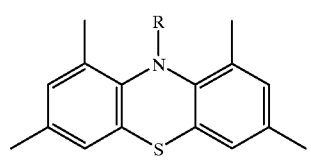
(R represents a hydrogen atom or alkyl group.)
(Z-45) 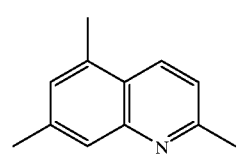
(Z-46) 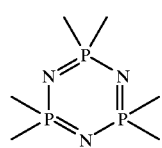
(Z-47) 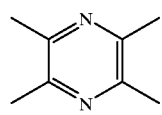
(Z-48) 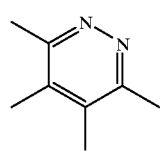
(Z-49) 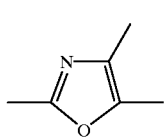
(Z-50) 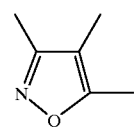
(Z-51) 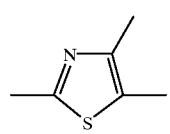
(Z-52) 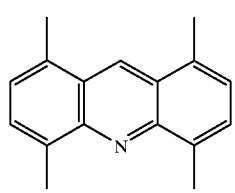
(Z-53) 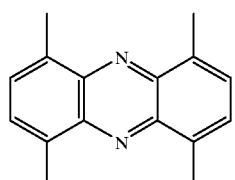
(Z-54) 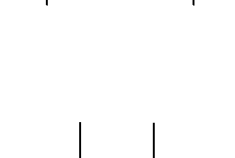
(Z-55) 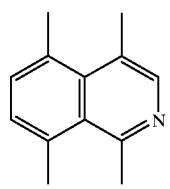
(Z-56) 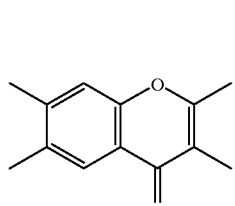
(Z-57) 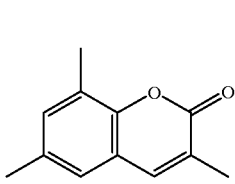

(Z-58)
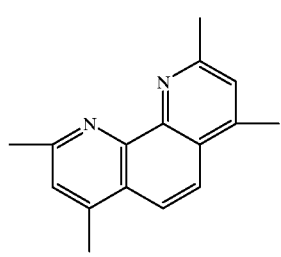
Examples of organic dye molecules exhibiting crystalline-amorphous phase change are shown in (P1) to (P8).
Examples of X in the general formula Z-(X–Y)$_n$
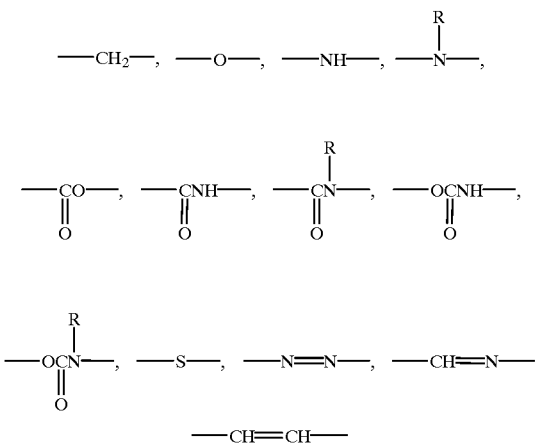
(P-1)
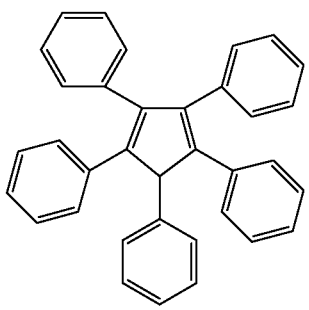
(P-2)
(P-3)
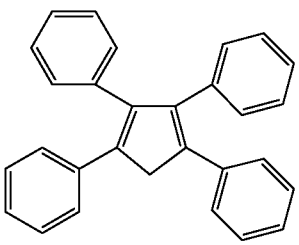
(P-4)
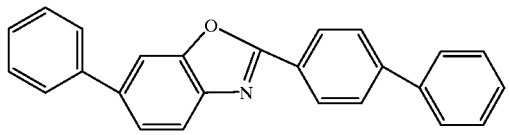
(P-5)
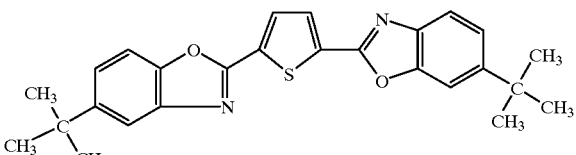
(P-6)
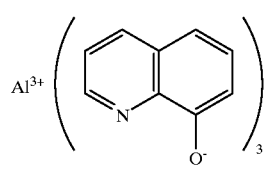
(P-7)
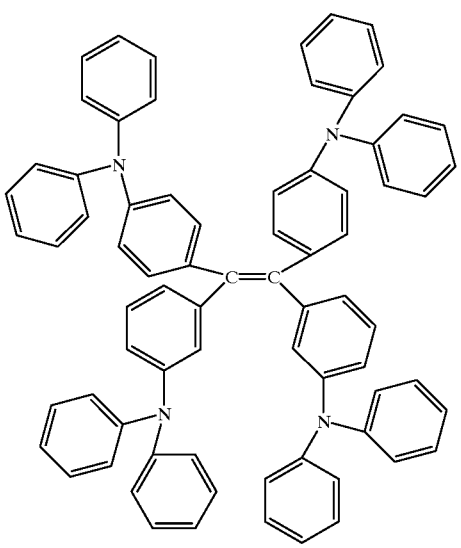

(P-8)

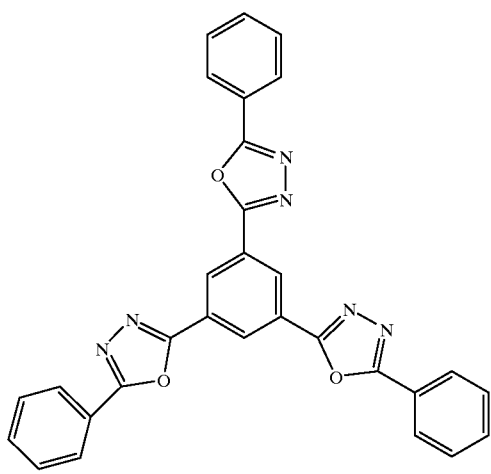

Examples of the fluorescent organic dye molecules are shown in (F1) to (F34), where each of (F1) to (F5) is carbocyanine; each of (F6) to (F8) is dicarbocyanine; each of (F9) to (F11) is tricarbocyanine; (F12) is tetracarbocyanine; (F13) is pentacarbocyanine; each of (F14) to (F17) is styryl dye; each of (F18) to (F20) is coumalin dye; (F21) is porphyrin dye; each of (F22) to (F25) is hydrocarbon; (F26) is squalium dye; (F27) is pyranone dye; (F28) is carbostyryl dye; each of (F29) and (F30) is Rhodamine dye; and each of (F31) to (F34) is scintillator dye.

(F1)

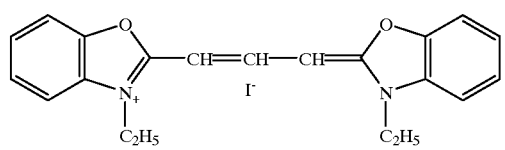

absorbtion 483 nm
emission 541 nm (F2)

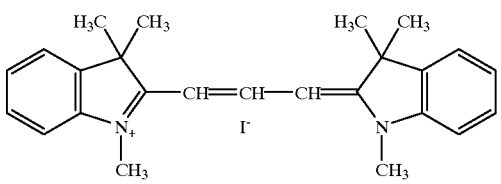

absorbtion 545 nm
emission 614 nm (F3)

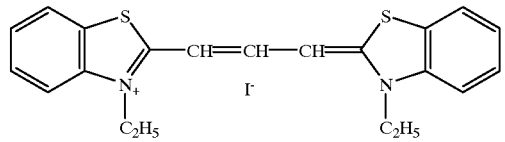

absorbtion 557 nm
emission 625 nm (F4)

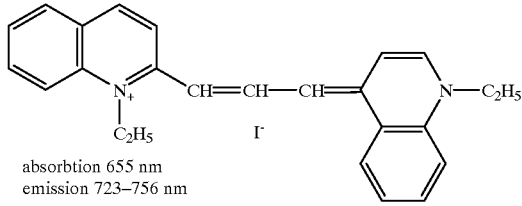

absorbtion 655 nm
emission 723–756 nm (F5)

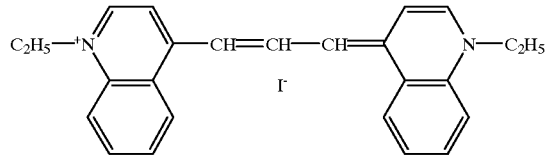

absorbtion 707 nm
emission 745–808 nm (F6)

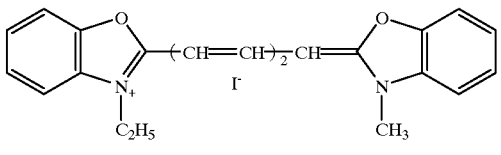

absorbtion 580 nm
emission 610–679 nm

-continued
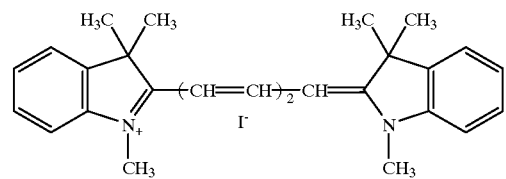
(F7)
absorbtion 638 nm
emission 725–740 nm
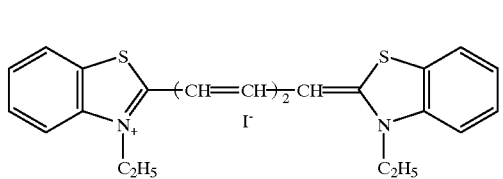
(F8)
absorbtion 652 nm
emission 670–775 nm
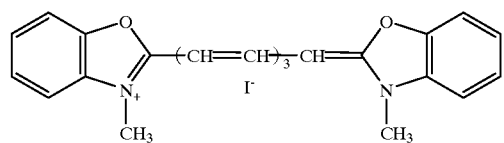
(F9)
absorbtion 681 nm
emission 720–864 nm
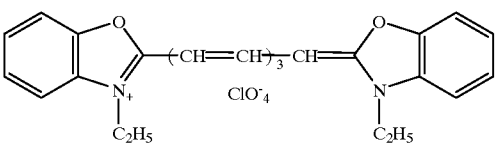
(F10)
absorbtion 683 nm
emission 720–860 nm
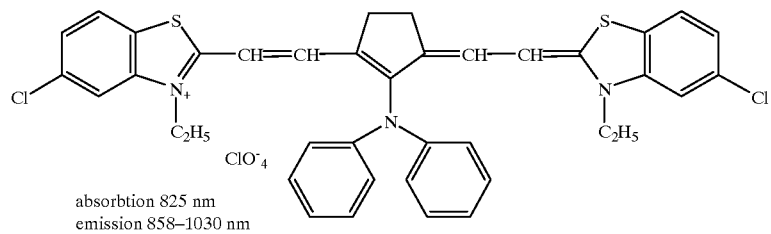
(F11)
absorbtion 825 nm
emission 858–1030 nm
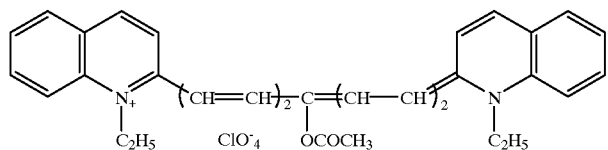
(F12)
absorbtion 927 nm
emission 1020–1140 nm
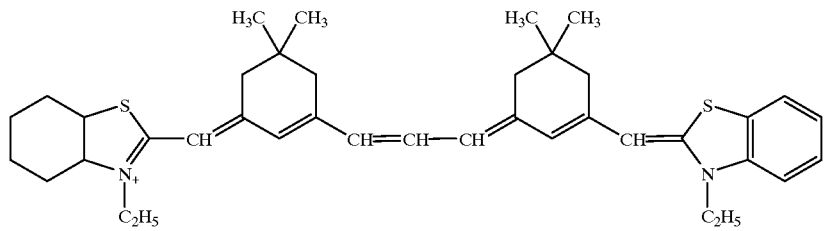
(F13)
absorbtion 1010 nm
emission 1092–1148 nm
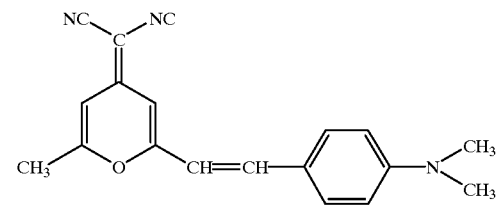
(F14)
absorbtion 469 nm
emission 610–710 nm
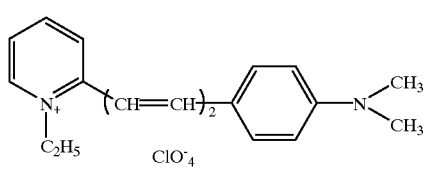
(F15)
absorbtion 483 nm
emission 645–808 nm -continued
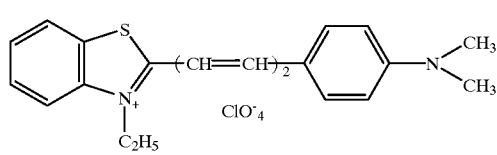
(F16)
absorbtion 568 nm
emission 711–845 nm
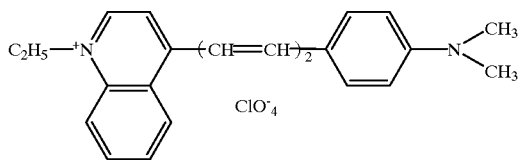
(F17)
absorbtion 566 nm
emission 765–850 nm
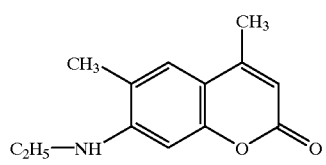
(F18)
absorbtion 368 nm
emission 430–492 nm
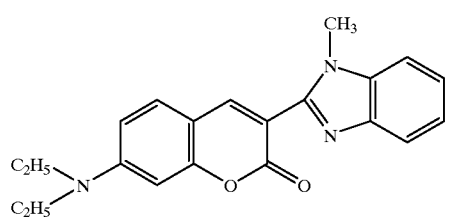
(F19)
absorbtion 416 nm
emission 480–550 nm
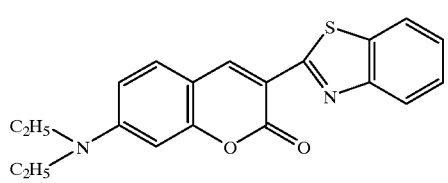
(F20)
absorbtion 458 nm
emission 507–585 nm
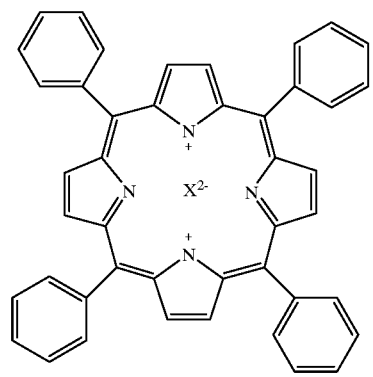
(F21)
X = Zn, Mg
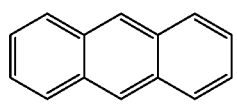
(F22)
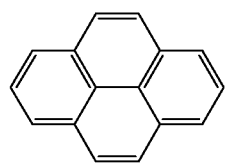
(F23)
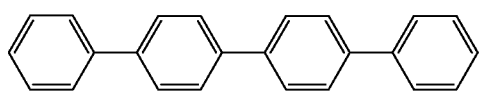
(F24)
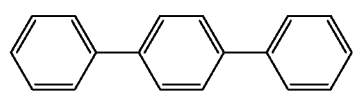
(F25)
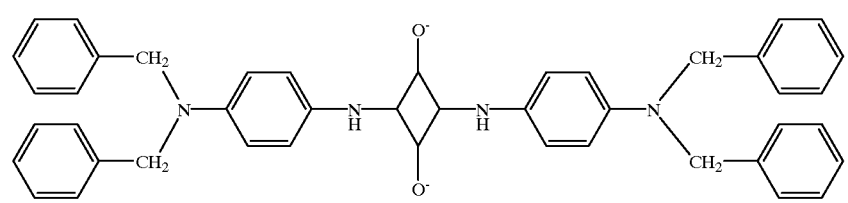
(F26)

(F27)
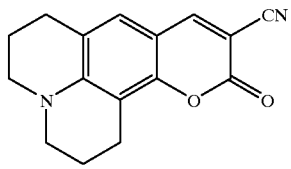

(F28)
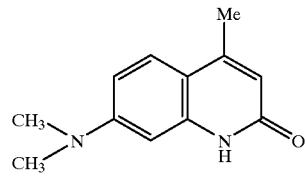

(F29)
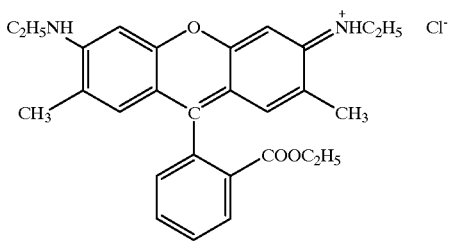

absorption 530 nm
emission 550–655 nm (F30)
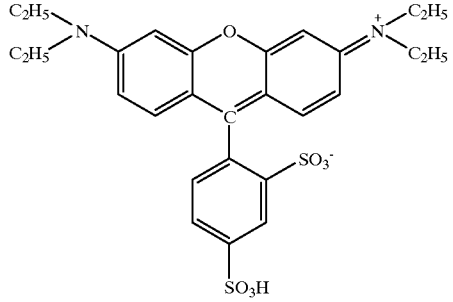

absorption 554 nm
emission 570–680 nm (F31)
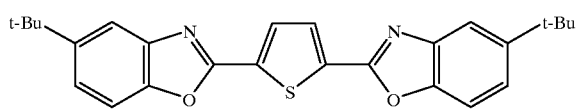

absorption 370 nm
emission 435 nm (F32)
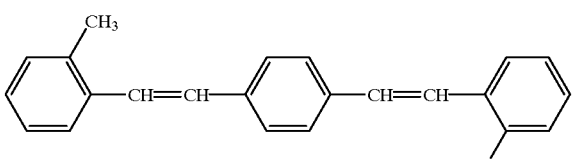

absorption 430 nm
emission 420–446 nm (F33)
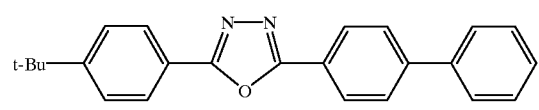

absorption 303 nm
emission 366 nm (F34)

emission 418 nm

Examples of photochromic organic dye molecules are spirooxazine, diaryl ethene, fulgide, indigo, spiropyrane, cyclophane, chalcone, condensed polycyclic compounds.

As the organic molecule film constituting the isolation region, following polymer compounds are employed. Namely, polyethylene; chlorinated polyethylene; ethylene copolymers such as ethylene-vinyl acetate copolymer and ethylene-acrylic acid-maleic anhydride copolymer; polybutadiene; polyesters such as polyethylene terephthalate, polybutylene terephthalate and polyethylene naphthalate; polypropylene; polyisobutylene; polyvinyl chloride; polyvinylidene chloride; polyvinyl acetate; polyvinyl alcohol; polyvinyl acetal; polyvinyl butyral; ethylene tetrafluoride resin; ethylene trifluoride chloride resin; ethylene fluoride-propylene resin; vinylidene fluoride resin; vinyl fluoride resin; ethylene tetrafluoride copolymers such as ethylene tetrafluoride-perfluoroalkoxyethylene copolymer, ethylene tetrafluoride-propylene hexafluoride copolymer and ethylene tetrafluoride-ethylene copolymer; fluororesins such as fluorine-containing polybenzooxazole; acrylic resin; methacrylic resins such as methyl polymethacrylate; fumarate resins such as polydiisobutyl fumarate; polyacrylonitrile; acrylonitrile copolymers such as acrylonitrile-butadiene-styrene copolymer; polystyrene; halogenated polystyrene; styrene copolymers such as styrene-methacrylate copolymer and styrene-acrylonitrile copolymer; ionomers such as sodium polystyrene sulfonate and sodium polyacrylate; acetal resin; polyamides such as nylon 66; gelatin; gum arabic; polycarbonate; polyester carbonate; cellulose resin; phenolic resin; urea resin; epoxy resin; unsaturated polyester resin; alkyd resin; melamine resin; polyurethane; dialylphthalate; polyphenylene oxide; polyphenylene sulfide; polysulfone; polyphenyl sulfone; silicone resin; polyimide; bismaleimide triazine resin; polyimide amide; polyether sulfone; polymethylpentene; polyether ether ketone; polyether imide; polyvinyl carbazole; and norbornene-based amorphous polyolefin.

Examples of inorganic phase-change material employed as a recording material are Sb—Se, Sb—Te, Ga—Se, Te—Se—Sb, Te—Ga—Se, Te—Ge—Sn, Te—As—Ge, $Cs_2$—Te, Ge—Sb—Te, Ag—In, and In—Sb—Te.

Recording and reproducing of the recording medium according to the present invention can be performed by various methods. In order to write information on the recording medium by injecting an electric charge into the recording domains, a probe of an atomic force microscope (AFM), for example, may be used. As for the light source for performing writing or reading information on or from the recording medium by irradiating the recording domains with light, a semiconductor laser is most preferable, because it can form very small recording bit and it is useful to make a recording apparatus, as a whole, more compact. As means for near field light irradiation, it is possible to employ either an optical fiber having a tapered tip end or a solid immersion lens. However, the employment of the optical fiber is more preferable, since it can reduce the area of light irradiation. Although there is not any particular limitation with regard to the photodetector, a semiconductor photodiode is most preferable, since it is useful to make a recording apparatus, as a whole, more compact.

EXAMPLES

Examples of the present invention will be described below.

Example 1

FIG. 1 shows a cross-sectional view of the recording medium in this example. The recording medium can be manufactured by the following method.

Figure 2:
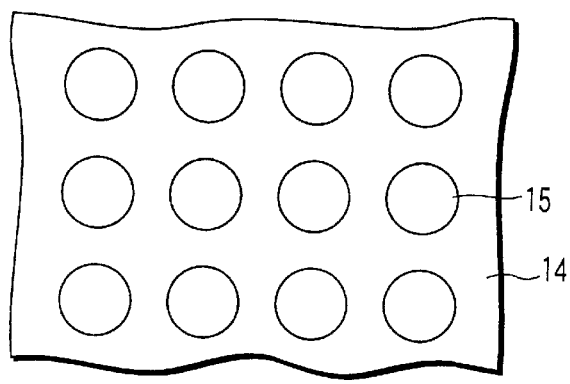
FIG. 2 is a plan view of the recording medium according to Example 1.

An Al film 12 having a thickness of 200 nm is vacuum-deposited on a mirror-polished surface of a glass disk having a diameter of 120 mm and a thickness of 1.2 mm. The Al film 12 functions as a conductive film and a reflective film. Then, an $SiO_2$ film 13 having a thickness of 200 nm as a hydrophilic insulating film is formed on the Al film 12 by sputtering. Thereafter, polydiisobutyl fumarate as an electron beam resist is spin-coated on the $SiO_2$ film 13 in a thickness of 50 nm. The resist is irradiated with an electron beam by making use of an electron beam printing system, so as to perform patterned exposure in which many circular regions, each having a size of 30 nm and being spaced apart to each other by 50 nm in a center-to-center distance, are regularly arranged. The resist is then subjected to development using ethanol. As a result, the $SiO_2$ film 13 is selectively exposed at the regions where the resist is removed. The exposed $SiO_2$ film regions have high surface energy as compared with the surrounding resist. The residual resist is employed as an isolation region 14 to retain the recording domains. A donor organic dye molecule represented by the chemical formula (D-E1) is vacuum-deposited, and then is heated for one hour at 80° C. in a nitrogen atmosphere in order to allow the organic dye molecules to be self-aggregated selectively on the exposed $SiO_2$ film regions. It is confirmed from AFM observation that dot-like recording domains 15 comprising the organic dye molecule are periodically formed on the disk as shown in FIG. 2.

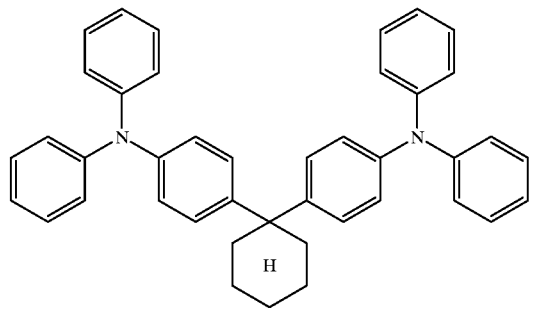

(D-E1)

With respect to the recording medium thus obtained, recording is performed by injecting positive charges (holes) into the dot-like recording domains 15 by means of an AFM probe coated with Au under an applied voltage of 30V.

The recording medium is left to stand for one week at 80° C. When the recording medium is observed by means of AFM, there is no change in the shape of the recording domains 15 and 95% of the injected electric charges are retained.

Comparative Example 1

Figure 3:
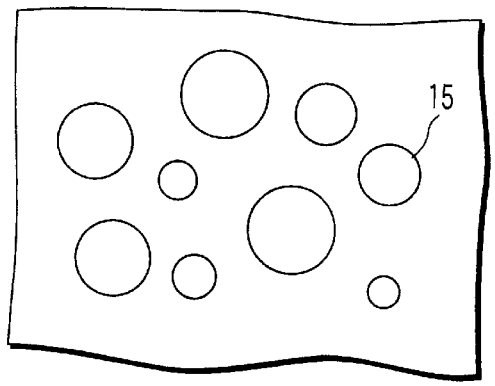
FIG. 3 is a plan view of the recording medium according to Comparative Example 1.

An Al film having a thickness of 200 nm is vacuum-deposited on a mirror-polished surface of a glass disk having a diameter of 120 mm and a thickness of 1.2 mm. Then, an $SiO_2$ film having a thickness of 200 nm is deposited on the Al film by sputtering. The $SiO_2$ film is then treated with a silane coupling agent to make the surface of the $SiO_2$ film hydrophobic. A donor organic dye molecule represented by the chemical formula (D-E1) is vacuum-deposited on the $SiO_2$ film, followed by heat-treating for one hour at 80° C. in a nitrogen atmosphere. It is confirmed from AFM observation that dot-like recording domains 15 consisting of the organic dye molecule are formed randomly on the disk as shown in FIG. 3.

With respect to the recording medium thus obtained, recording is performed by injecting holes into the dot-like recording domains 15 by means of an AFM probe coated with Au under an applied voltage of 30V.

The recording medium is left to stand for one week at 80° C. When the recording medium is observed by means of AFM, it is found that the recording domains 15 are combined with each other, thus making larger domains.

Example 2

Figure 4:
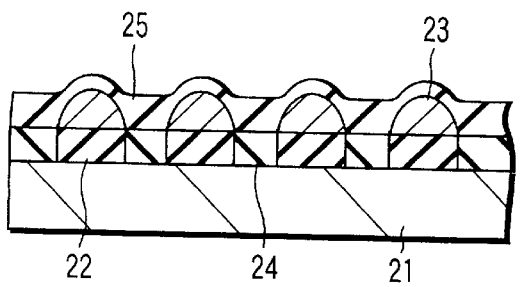
FIG. 4 is a cross-sectional view of the recording medium according to Example 2.

FIG. 4 shows a cross-sectional view of a recording medium in this example. The recording medium can be manufactured by the following method.

A silicon wafer 21 having a diameter of 3 inches and a thickness of 1.2 mm is subjected to a hydrofluoric acid treatment to remove a natural oxide film, thereby allowing the silicon wafer 21 to be terminated with hydrogen atoms (formation of a hydrogen-terminated atomic film). The silicon wafer 21 is then irradiated with an electron beam by making use of FE-SEM, so as to perform patterned exposure in which many circular regions, each having a size of 10 nm and being spaced apart by 20 nm in a center-to-center distance, are regularly arranged. The silicon wafer 21 is then left to stand in air atmosphere of a clean room for one hour, thereby forming an $SiO_2$ film 22 selectively on the electron beam exposure regions, thus forming hydrophilic regions exhibiting a higher surface energy. A donor organic dye molecule represented by the chemical formula (D-E2) is vacuum-deposited, and then is heated for one hour at 80° C. in a nitrogen atmosphere in order to allow the organic dye molecules to be self-aggregated selectively on the SiO$_2$ film 22, thus forming recording domains 23. The silicon wafer 21 is left to stand in air atmosphere for one day at 40° C. thereby forming an SiO$_2$ film 24 also on the surface of the silicon wafer 21 where the electron beam is not irradiated. Thereafter, the whole surface of the silicon wafer 21 is spin-coated with an aqueous solution of polyhydroxyethyl cellulose, and then dried to form an isolation region 25. In this case, the polyhydroxyethyl cellulose film is formed also on the recording domains 23. It is confirmed from AFM observation that dot-like recording domains 23 comprising the organic dye molecule are periodically formed on the disk.

(D-E2)

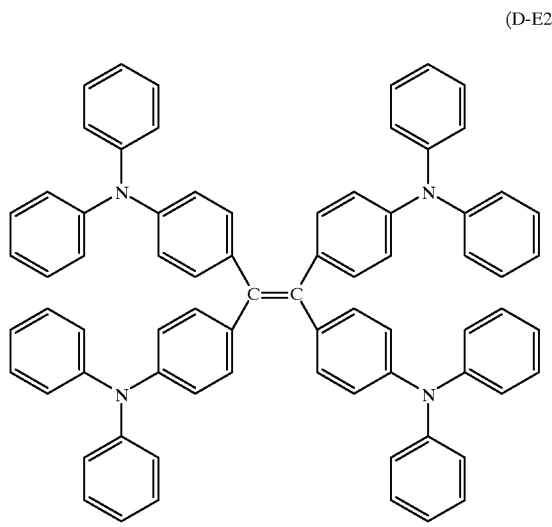

With respect to the recording medium thus obtained, recording is performed by injecting holes into the dot-like recording domains 23 by means of an AFM probe coated with Au under an applied voltage of 30V. It is confirmed from fluorescence intensity measurement by means of NSOM that the fluorescence intensity of the recording domains is decreased by 50% due to the injection of electric charges.

The recording medium is left to stand for one week at 80° C. When the recording medium is observed by means of AMF, there is no change in the shape of the recording domains 23 and 95% of the injected electric charges are retained. Further, the fluorescence intensity is almost the same as that measured immediately after the hole-injection (recording).

Comparative Example 2

A recording medium is manufactured in the same manner as described in Example 2 excepting that the polyhydroxyethyl cellulose film as an isolation region is not formed. It is confirmed from AFM observation that dot-like recording domains comprising the organic dye molecule are formed on the disk.

With respect to the recording medium thus obtained, recording is performed by injecting holes into the dot-like recording domains by means of an AFM probe coated with Au under an applied voltage of 50V. The recording medium is left to stand for one week at 80° C. When the recording medium is observed by means of AMF, the domains are combined with each other, thus making larger domains.

Example 3

An Al film having a thickness of 200 nm is vacuum-deposited on a mirror-polished surface of a glass disk having a diameter of 120 mm and a thickness of 1.2 mm. Then, an SiO$_2$ film having a thickness of 200 nm as a hydrophilic insulating film is deposited on the Al film by sputtering. Thereafter, polydiisobutyl fumarate as an electron beam resist is spin-coated on the SiO$_2$ film in a thickness of 50 nm. The resist is irradiated with an electron beam by making use of an electron beam printing system, so as to perform patterned exposure in which many circular regions, each having a size of 30 nm and being spaced apart to each other by 50 nm in a center-to-center distance, are regularly arranged. The resist is then subjected to development using ethanol. As a result, the SiO$_2$ film 13 selectively exposed at the regions where the resist is removed. The exposed SiO$_2$ film regions have high surface energy as compared with the surrounding resist. The residual resist is employed as an isolation region to retain the recording domains. An organic dye molecule represented by the chemical formula (P-E1) and exhibiting crystalline-amorphous phase change is vacuum-deposited, and then is heated for two hours at 140° C. in a nitrogen atmosphere in order to allow the organic dye molecules to be self-aggregated selectively on the exposed SiO$_2$ film regions. It is confirmed from AFM observation that dot-like recording domains comprising the organic dye molecule are periodically formed on the disk. In this stage, the organic dye molecules constituting the recording domains is in a crystalline state. If the organic dye molecules is irradiated with light, they turn into an amorphous state from the crystalline state.

(P-E1)

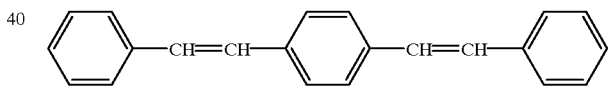

Figure 5:
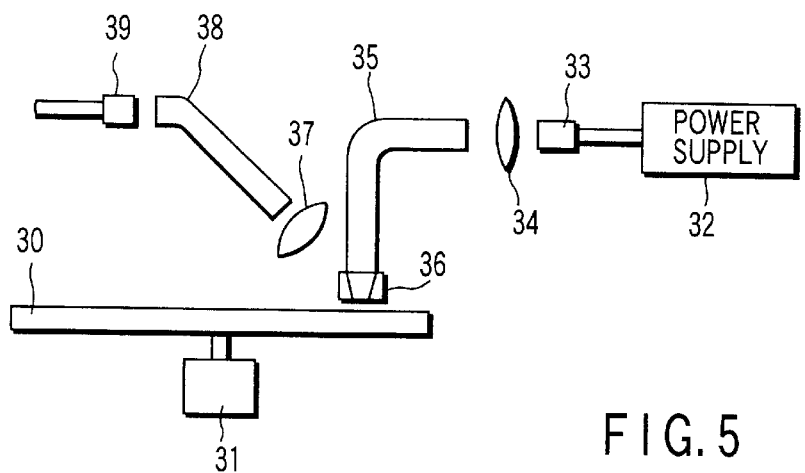
FIG. 5 is a schematic view illustrating the construction of the apparatus employed for recording, reproducing and erasing the recording medium according to Example 2.

FIG. 5 shows a recording/reproducing apparatus. A disk 30 is mounted on a spindle motor 31. The disk 30 is coated with a lubricating agent (not shown). A semiconductor laser 33 is actuated by means of a power supply 32, the output thereof being variable. The beam emitted from the semiconductor laser 33 is transmitted via a lens 34 and an optical fiber 35 to the disk 30, thereby irradiating the disk 30. The optical fiber 35 is tapered such that the size of the opening thereof is set to 10 nm. The distal end of the optical fiber 35 is secured by means of a mount 36, and the spacing between the distal end of the optical fiber and the disk 30 is kept to 20 nm. The beam reflected from the disk 30 is passed through a lens 37 and an optical fiber 38 and then detected by a semiconductor photodiode 39.

Using the apparatus shown in FIG. 5, recording, reproducing and erasing of the recording medium are performed as follows. First, the disk 30 is rotated at a rate of 4,000 rpm by means of the motor 31. While irradiating the disk 30 with a near-field beam, having a wavelength of 430 nm and an output of 10 mW, emitted from the semiconductor laser 33 and transmitted via the lens 34 and the optical fiber 35, the mount 36 is actuated in the radial direction of the disk, thereby recording is performed spirally on the disk 30. As a result of light irradiation, the organic dye molecules constituting the recording domains is changed from crystalline to amorphous. Then, the disk 30 is irradiated with a near-field beam from the semiconductor laser 33, having an output of 2 mW, and the beam reflected from the disk 30 is detected by the semiconductor photodiode 39, thereby reproducing the recorded data. In the recorded regions, the intensity of reflected light is reduced by 5% due to transition to the amorphous state. Then, the disk 30 is irradiated with a near-field beam from the semiconductor laser 33, having an output of 7 mW, thus erasing is performed. When reproducing is performed again, the intensity of reflected light is recovered to the original level because of crystallization.

A recording operation is performed again, thereby turning the organic dye molecules constituting the recording domains into an amorphous state. The recording medium is left to stand for one week at 40° C. When the intensity of the reflected light is measured, there is no substantial difference in the intensity from that obtained immediately after the recording, which shows that the amorphous state of the organic dye molecules is maintained stably.

Comparative Example 3

An Al film having a thickness of 200 nm is vacuum-deposited on a mirror-polished surface of a glass disk having a diameter of 120 mm and a thickness of 1.2 mm. Then, an SiO$_2$ film having a thickness of 200 nm is deposited on the Al film by sputtering. An organic dye molecule represented by the chemical formula (P-E1) exhibiting crystalline-amorphous transition is vacuum-deposited on the SiO$_2$ film, and then is heated for two hours at 140° C. in a nitrogen atmosphere. It is confirmed from AFM observation that a uniform film consisting of the organic dye molecule is formed.

Recording of the recording medium is performed by using the apparatus shown in FIG. 5, in which a part of the recording domains is turned to be amorphous by irradiating with a near-field beam. The recording medium is left to stand for one week at 40° C. When the intensity of reflected light is measured, it is found that the recorded regions are turned back to be crystalline, which exhibits that the amorphous state of the recorded region is not maintained stably.

Example 4

A silicon wafer having a diameter of 3 inches and a thickness of 1.2 mm is subjected to a hydrofluoric acid treatment to remove a natural oxide film formed on the silicon wafer, thereby allowing the silicon wafer to be terminated with hydrogen atom (formation of a hydrogen-terminated atomic film). The silicon wafer is then irradiated, through an optical fiber having an opening of 10 nm in size, with a near-field beam having a wavelength of 350 nm and output of 10 mW emitted from a semiconductor laser in the presence of a gas of an aldehyde derivative having a terminal hydroxyl group so as to perform patterned exposure, in which many circular regions, each having a size of 10 nm and being spaced apart to each other by 20 nm in center-to-center distance, are regularly arranged. In the regions where the near-field beam is irradiated, the surface of the silicon wafer is reacted with the aldehyde derivative, so that the surface regions are turned to be hydrophilic due to the hydroxyl group of aldehyde derivative. A donor organic dye molecule represented by the chemical formula (D-E2) is vacuum-deposited, and then is heated for one hour at 80° C. in a nitrogen atmosphere, thereby allowing the organic dye molecules to be self-aggregated selectively on the hydrophilic regions, thus forming recording domains. The silicon wafer is left to stand in air atmosphere for one day at 40° C. thereby forming an SiO$_2$ film also on the surface of the silicon wafer where the near-field beam is not irradiated. Thereafter, the whole surface of the silicon wafer is spin-coated with an aqueous coating agent (Matsumoto Resin Co., Ltd.) to form an isolation region consisting of a polymer film. In this case, the polymer film is not formed on the recording domains made of the highly hydrophobic organic dye molecules. It is confirmed from AFM observation that dot-like recording domains consisting of the organic dye molecule are periodically formed on the wafer.

$$HO\text{-}(CH_2)_5CHO \qquad (AL\text{-}1)$$

With respect to the recording medium thus obtained, recording is performed by injecting holes into the dot-like recording domains by means of an AFM probe coated with Au under an applied voltage of 30V. It is confirmed from fluorescence intensity measurement by means of NSOM that the fluorescence intensity of the recording domains is decreased by 50% due to the injection of electric charges.

The recording medium is left to stand for one week at 80° C. When the recording medium is observed by means of AMF, there is no change in the shape of the recording domains and 95% of the injected electric charges are retained. Further, the fluorescence intensity is almost the same as that measured immediately after the hole-injection (recording).

Example 5

An Al film having a thickness of 200 nm is vacuum-deposited on a mirror-polished surface of a glass disk having a diameter of 120 mm and a thickness of 1.2 mm. Then, an SiO$_2$ film having a thickness of 200 nm is deposited on the Al film by sputtering. Thereafter, polydiisobutyl fumarate functioning as an electron beam resist is spin-coated on the SiO$_2$ film in a thickness of 50 nm. The resist is irradiated with an electron beam by making use of an electron beam printing system so as to perform patterned exposure in which many circular regions, each having a size of 30 nm and being spaced apart by 50 nm in a center-to-center distance, are regularly arranged. The resist is then subjected to development using ethanol. As a result, the SiO$_2$ film 13 is selectively exposed at the regions where the resist is removed. The exposed SiO$_2$ film regions have high surface energy as compared with the surrounding resist. The residual region of the resist is employed as an isolation region to retain the recording domains. A photochromic compound represented by the chemical formula (C-E1) and cholic acid exhibiting a transparent amorphous state are codeposited, and then is heated for two hours at 140° C. in a nitrogen atmosphere in order to allow the photochromic compounds to be self-aggregated selectively on the exposed SiO$_2$ film regions. It is confirmed from AFM observation that dot-like recording domains consisting of the photochromic compounds are periodically formed on the disk. Thereafter, a silicone hard coat layer is formed on the whole surface.

(C-E1)

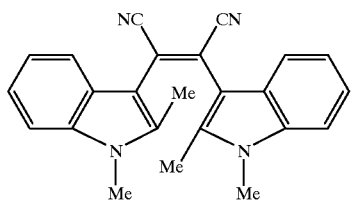

When the absorption intensity of the recording signal is measured by means of NSOM, the signal intensity ratio between the recorded domains and the non-recorded domains is found to be 10.

Comparative Example 4

An Al film having a thickness of 200 nm is vacuum-deposited on a mirror-polished surface of a glass disk having a diameter of 120 mm and a thickness of 1.2 mm. Then, an $SiO_2$ film having a thickness of 200 nm is deposited on the Al film by sputtering. A photochromic compound represented by the chemical formula (C-E1) and cholic acid exhibiting a transparent amorphous state are codeposited, and then heated for two hours at 140° C. in a nitrogen atmosphere. It is confirmed from AFM observation that a uniform film comprising cholic acid with the photochromic compound dispersed therein is formed on the disk. Thereafter, a silicone hard coat layer is formed on the whole surface.

When the absorption intensity of the recording signal is measured by means of NSOM, the signal intensity ratio between the recorded domains and the non-recorded domains is found to be 7, which indicates increase in signal noise as compared with Example 5.

Example 6

A silicon substrate is coated with an electron beam resist and then subjected to exposure using an electron beam printing system. After the resist is developed, the silicon substrate is etched to prepare a stamp provided with many cylindrical protrusions each having a size of 30 nm and a height of 80 nm and being spaced apart to each other by 50 nm.

An Al film having a thickness of 200 nm is vacuum-deposited on a mirror-polished surface of a glass disk having a diameter of 120 mm and a thickness of 1.2 mm. Then, an $SiO_2$ film having a thickness of 200 nm is deposited on the Al film by sputtering. Thereafter, polymethylmethacrylate as an electron beam resist is spin-coated on the $SiO_2$ film in a thickness of 50 nm.

The stamp is heated to 200° C. and is pressed onto the electron beam resist at a load of 1 kg/cm². After being cooled, the stamp is removed and the resist is etched using oxygen plasma so as to allow the $SiO_2$ film to expose selectively at the regions where the cylindrical protrusions are pressed. The exposed $SiO_2$ film regions have high surface energy as compared with the surrounding resist. The residual region is employed as an isolation region to retain the recording domains. A donor organic dye molecule represented by the chemical formula (D-E1) is vacuum-deposited, and then is heated for one hour at 80° C in a nitrogen atmosphere in order to allow the organic dye molecules to be self-aggregated selectively on the exposed $SiO_2$ film regions. It is confirmed from AFM observation that dot-like recording domains consisting of the organic dye molecules are periodically formed on the disk.

With respect to the recording medium thus obtained, recording is performed by injecting holes into the dot-like recording domains by means of an AFM probe coated with Au under an applied voltage of 30V.

The recording medium is left to stand for one week at 80° C. When the recording medium is observed by means of AMF, there is no change in the shape of the recording domains and 95% of the injected electric charges are retained.

Example 7

A silicon substrate is coated with an electron beam resist and then subjected to exposure using an electron beam printing system. After the resist is developed, the silicon substrate is etched to prepare a stamp provided with many pits each having a size of 30 nm and a depth of 40 nm and being spaced apart to each other by 50 nm.

An Al film having a thickness of 200 nm is vacuum-deposited on a mirror-polished surface of a glass disk having a diameter of 120 mm and a thickness of 1.2 mm. Then, an $SiO_2$ film having a thickness of 200 nm is deposited on the Al film by sputtering. Thereafter, polymethylmethacrylate is coated on the stamp in a thickness of 10 nm. The stamp is heated to 140° C. and is pressed onto the $SiO_2$ film at a load of 0.3 kg/cm². After being cooled, the stamp is removed thereby forming a polymethylmethacrylate pattern, on the $SiO_2$ film, having holes corresponding to the pits of the stamp. The exposed $SiO_2$ film regions at the holes have high surface energy as compared with the surrounding resist. A donor organic dye molecule represented by the chemical formula (D-E1) is vacuum-deposited, and then is heated for one hour at 80° C. in a nitrogen atmosphere in order to allow the organic dye molecules to be self-aggregated selectively on the exposed $SiO_2$ film regions. It is confirmed from AFM observation that dot-like recording domains consisting of the organic dye molecules are periodically formed on the disk.

With respect to the recording medium thus obtained, recording is performed by injecting holes into the dot-like recording domains by means of an AFM probe coated with Au under an applied voltage of 30V.

The recording medium is left to stand for one week at 80° C. When the recording medium is observed by means of AMF, there is no change in the shape of the recording domains and 95% of the injected electric charges are retained.

Example 8

A silicon wafer having a size of 3 inches and a thickness of 1.2 mm is subjected to a hydrofluoric acid treatment to remove a natural oxide film, thereby allowing the silicon wafer to be terminated with hydrogen atoms. Based on the recording bit information, the silicon wafer is irradiated with an electron beam by making use of FE-SEM. Namely, if the recording bit is 1, the irradiation is not performed, while if the recording bit is 0, the irradiation is performed. In this manner, many circular regions each having a size of 20 nm are selectively irradiated with an electron beam. In this case, the center-to-center distance between the closest adjacent circular regions is set to 40 nm. The silicon wafer is then left to stand in an air atmosphere of a clean room for one hour, thereby forming an $SiO_2$ film selectively on the electron beam-irradiated regions. An organic dye molecule represented by the chemical formula (D-E2) is vacuum-deposited, and then is heated for one hour at 80° C. in a nitrogen atmosphere, in order to allow the organic dye molecules to be self-aggregated selectively on the $SiO_2$ film. It is confirmed from AFM observation that the regions consisting of the organic dye molecule are formed selectively on the regions where the electron beam is irradiated based on the recording bit information. Then, the wafer is etched using oxygen plasma so as to form pits each having a depth of 40 nm at the region where the organic dye molecules are not formed. In this manner, a master disk of a read-only optical recording medium (ROM) is manufactured.

Example 9

An Al film having a thickness of 200 nm is vacuum-deposited on a mirror-polished surface of a glass disk having a diameter of 120 mm and a thickness of 1.2 mm. Then, an $SiO_2$ film having a thickness of 200 nm is deposited on the Al film by sputtering. Thereafter, polymethylmethacrylate as an electron beam resist is spin-coated on the $SiO_2$ film in a thickness of 30 nm. Then, the master disk manufactured in Example 8 is heated to 200° C. and is pressed onto polymethylmethacrylate at a load of 0.8 kg/cm². After being cooled, the master disk is removed. A donor organic dye molecule represented by the chemical formula (D-E2) is vacuum-deposited, and then is heated for one hour at 80° C. in a nitrogen atmosphere. It is confirmed from AFM observation that the recording domains are arranged in conformity with the recording information formed on the master disk.

When the fluorescence intensity of the recording signal is measured by means of NSOM, the signal intensity ratio between the recording domains and the non-recording domains is found to be 12. Therefore, it is proved that the recording medium can be used as a read-only optical recording medium (ROM).

Example 10

A silicon wafer having a size of 3 inches and a thickness of 1.2 mm is subjected to a hydrofluoric acid treatment to remove a natural oxide film, thereby allowing the silicon wafer to be terminated with hydrogen atoms. Then, the silicon wafer is irradiated with an electron beam by making use of FE-SEM so as to perform patterned exposure in which many circular regions each having a size of 10 nm and being spaced apart by 20 nm to each other in a center-to-center distance are regularly arranged. The silicon wafer is then left to stand in an air atmosphere of a clean room for one hour, thereby forming an $SiO_2$ film selectively on the electron beam-irradiated regions, thus forming hydrophilic regions exhibiting high surface energy. Then, hydrophobic polyvinylcarbazole and slightly hydrophilic polymethylmethacrylate are dissolved in chlorobenzene to obtain a solution. The solution is spin-coated on the silicon wafer, and then is heated for one hour at 80° C. in a nitrogen atmosphere. It is confirmed from fluorescence observation by means of NSOM that polymethylmethacrylate is formed on the electron beam-irradiated regions, while polyvinylcarbazole is formed on the regions where the electron beam is not irradiated, thus indicating a phase separation.

With respect to the recording medium thus obtained, recording in performed by injecting holes into the regions of polyvinylcarbazole by means of an AFM probe coated with Au under an applied voltage of 50V. When fluorescence intensity of the recording signal is measured by means of NSOM, it is found that the fluorescence intensity is decreased by 60% due to hole-injection.

The recording medium is left to stand for one week at 80° C. When the recording medium is observed by means of AMF, there is no change in the shape of the recording domains 15 and 95% of the injected electric charges are retained. The fluorescence intensity is also found to be almost the same as that measured immediately after the hole-injection (recording).

Example 11

The surface of a silicon wafer having a size of 3 inches and a thickness of 1.2 mm is oxidized to form an $SiO_2$ film having a thickness of 200 nm. Based on the recording bit information, the silicon wafer is irradiated with ion beam by making use of an ion beam printing system. Namely, if the recording bit is 1, the irradiation is not performed, while if the recording bit is 0, the irradiation is performed. In this manner, many circular regions each having a size of 25 nm are selectively irradiated with an ion beam. In this case, the center-to-center distance between the closest adjacent circular regions is set to 45 nm. It is found from AMF observation that holes each having a depth of about 5 nm are formed at the ion beam-irradiated regions. An organic dye molecule represented by the chemical formula (D-E2) is vacuum-deposited, and then is heated for one hour at 150° C. in a nitrogen atmosphere. It is confirmed from AFM observation that crystal grains of the organic dye molecules having a size of about 30 nm are formed selectively on the ion beam-irradiated regions. Then, an aqueous emulsion of epoxy resin is spin-coated on the wafer, thereby forming an isolation region consisting of the epoxy resin. Thereafter, a silicone hard coat layer is formed on the whole wafer.

When the fluorescence intensity is measured by means of NSOM, the signal intensity ratio between the recorded domains and the non-recorded domains is found to be 15. Therefore, it is proved that the recording medium can be used as a ROM.

Example 12

Figure 6:
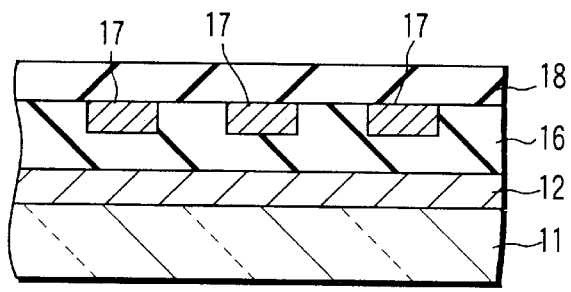
FIG. 6 is a cross-sectional view of the recording medium according to Example 12.

FIG. 6 shows a cross-sectional view of the recording medium in this example. The recording medium can be manufactured by the following method.

An SiC plate is worked to obtain a stamp provided with a periodical pattern of protrusions each having a tip-end size of about 5 nm and being spaced apart to each other by 50 nm.

An Al film 12 having a thickness of 500 nm is vacuum-deposited on a mirror-polished surface of a glass disk 11 having a diameter of 120 mm and a thickness of 1.2 mm. Then, the stamp is pressed onto the Al film 12 so as to form flaws in the Al film 12. Then, the Al film 12 is subjected to an anodic oxidation in an aqueous solution of dilute sulfuric acid. In this case, the oxidation is proceeded to form $Al_2O_3$ and, at the same time, the $Al_2O_3$ is chemically etched around the flaws formed by the stamp. As a result, many pits having a size of 20 nm and depth of 20 nm are formed in the $Al_2O_3$ film 16 (melting point: about 2,000° C.) having a thickness of 100 nm and employed as an isolation region.

Thereafter, $Ge_2Sb_2Te_5$ (melting point: 600° C.) as an inorganic phase-change material is melted in vacuum and then charged into the pits in the $Al_2O_3$ film 16, thereby forming a recording domains 17. Then, while being heated at 700° C., this disk is rotated at a rate of 200 rpm so as to remove an excessive recording material out of the pits by centrifugal force. Subsequently, a protective film 18 having a thickness of 10 nm is formed by ZnS—$SiO_2$ sputtering, thus manufacturing a recording medium.

Using the apparatus shown in FIG. 5, recording, reproducing and erasing of the recording medium are performed as follows. First, the disk 30 is rotated at a rate of 3,000 rpm by means of the motor 31. While irradiating the disk 30 with a near-field beam, having a wavelength of 480 nm and an output of 12 mW emitted from the semiconductor laser 33 and transmitted via the lens 34 and the optical fiber 35 to the disk 30, the mount 36 is actuated in the radial direction of the disk, thereby recording is performed spirally on the disk 30. As a result of light irradiation, the phase-change material constituting the recording domains is changed from a crystalline phase to an amorphous phase. Then, the disk 30 is irradiated with a near-field beam, having an output of 2 mW, from the semiconductor laser 33, and the reflected light from the disk 30 is detected by the semiconductor photodiode 39, thereby reproducing the recorded data. In the recorded regions, the intensity of reflected light is reduced by 5% due to the phase change of the recorded regions to an amorphous phase. Then, the disk 30 irradiating with a near-field beam, having an output of 7 mW, from the semiconductor laser 33, thus erasing is performed. When reproducing is performed again, the intensity of reflected light is recovered to the original level because of crystallization.

A recording operation is performed again, thereby turning the phase-change material constituting the recording domains into an amorphous phase. The recording medium is left to stand for one week at 100° C. When the intensity of the reflected light is measured, there is no substantial difference in the intensity from that obtained immediately after the recording, which shows that the amorphous state of the phase-change material is maintained stably.

Comparative Example 5

An Al film having a thickness of 500 nm is vacuum-deposited on a mirror-polished surface of a glass disk having a diameter of 120 mm and a thickness of 1.2 mm. Then, the Al film 12 is subjected to anodic oxidation in an aqueous solution of dilute sulfuric acid to obtain an $Al_2O_3$ film having a thickness of 100 nm. Thereafter, $Ge_2Sb_2Te_5$ film having a thickness of 20 nm is deposited on the $Al_2O_3$ film by sputtering. The $Ge_2Sb_2Te_5$ film thus obtained is partly discontinuous. Subsequently, a protective film having a thickness of 10 nm is formed by ZnS–$SiO_2$ sputtering, thus manufacturing a recording medium.

Using the apparatus shown in FIG. 5, recording domains in an amorphous state are formed by means of a near-field beam. After the recording medium is left to stand for one week at 100° C., the intensity of reflected light is measured. As a result, it is proved that the recording domains are partly turned into a crystalline phase, which means that the amorphous state is not maintained stably.

Example 13

Figure 7:
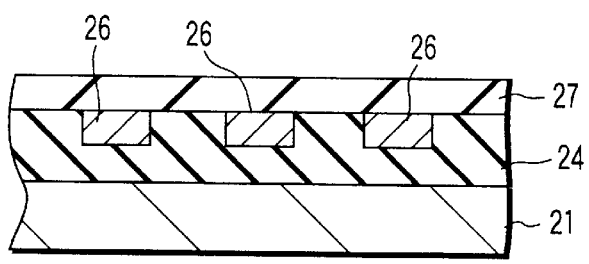
FIG. 7 is a cross-sectional view of the recording medium according to Example 13.

FIG. 7 shows a cross-sectional view of the recording medium in this example. The recording medium can be manufactured by the following method.

A silicon wafer 21 having a size of 3 inches and a thickness of 1.2 mm is subjected to a hydrofluoric acid treatment to remove a natural oxide film, thereby allowing the silicon wafer 21 to be terminated with hydrogen atoms. The silicon wafer 21 is then irradiated with an electron beam by making use of FE-SEM so as to perform patterned exposure in which many circular regions each having a size of 10 nm and being spaced apart by 30 nm to each other in a center-to-center distance are regularly arranged. The silicon wafer 21 is then left to stand in an air atmosphere of a clean room for one hour, thereby forming an $SiO_2$ film selectively on the electron beam exposure regions. The silicon wafer is subjected to a hydrofluoric acid treatment again to remove the $SiO_2$ film, thereby forming pits each having a size of 10 nm and a depth of 5 nm. A donor organic dye molecule represented by the chemical formula (D-E2) is vacuum-deposited as a recording layer, and then is heated for one hour at 80° C. in a nitrogen atmosphere. The silicon wafer is polished at room temperature using silica particles having a size of 100 nm so as to leave the organic dye molecules selectively in the pits, thereby forming recording domains 26. The silicon wafer is left to stand in an air atmosphere for one day at 40° C. thereby allowing an $SiO_2$ film 24 to be formed also on the surface region of the silicon wafer where the electron beam is not irradiated. Thereafter, a mixture consisting of polyaniline and polyvinyl chloride is spin-coated on the silicon wafer to form a protective film 27, thus manufacturing a recording medium. The conductivity of the protective film 27 is $10^{-7}$ $\sigma cm^{-2}$.

With respect to the recording medium thus obtained, recording is performed by injecting holes into the dot-like recording domains by means of an AFM probe coated with Au under an applied voltage of 30V. When fluorescence intensity is measured by means of NSOM, it is found that fluorescence intensity is decreased by 50% due to hole-injection.

The recording medium is left to stand for one week at 100° C. When the recording medium is observed by means of AMF, there is no change in the shape of the recording domains and 98% of the injected electric charges are retained. The fluorescence intensity is also found to be almost the same as that measured immediately after the hole-injection (recording).

Comparative Example 6

A silicon wafer having a size of 3 inches and a thickness of 1.2 mm is subjected to a hydrofluoric acid treatment to remove a natural oxide film, thereby allowing the silicon wafer to be terminated with hydrogen atoms. The silicon wafer is then irradiated with an electron beam by making use of FE-SEM so as to perform patterned exposure in which many circular regions each having a size of 10 nm and being spaced apart by 30 nm to each other in a center-to-center distance are regularly arranged. The silicon wafer is then left to stand in an air atmosphere of a clean room for one hour, thereby forming an $SiO_2$ film selectively on the electron beam exposure regions, thus forming hydrophilic regions exhibiting high surface energy. A donor organic dye molecule represented by the chemical formula (D-E2) is vacuum-deposited, and then is heated for one hour at 80° C. in a nitrogen atmosphere. As a result, recording domains consisting of the organic dye molecules is formed on the hydrophilic $SiO_2$ film. The silicon wafer is then left to stand in an air atmosphere for one day at 40° C. thereby allowing an $SiO_2$ film 24 to be formed also on the surface region of the silicon wafer where the electron beam is not irradiated.

With respect to the recording medium thus obtained, recording is performed by injected holes into the dot-like recording domains by means of an AFM probe coated with Au under an applied voltage of 30V.

The recording medium is left to stand for one week at 100° C. Then the recording medium is observed by means of AMF, finding out that the recording domains are combined with each other, thus making larger domains. In addition, injected electric charge is not detected.

Example 14

An Al film having a thickness of 200 nm is vacuum-deposited on a mirror-polished surface of a glass disk having a diameter of 120 mm and a thickness of 1.2 mm. Then, an SiO$_2$ film having a thickness of 200 nm as an inorganic material film is deposited on the Al film by sputtering. Thereafter, polydiisobutyl fumarate as an electron beam resist is spin-coated on the SiO$_2$ film in a thickness of 40 nm. The resist is then irradiated with an electron beam by making use of an electron beam printing system so as to perform patterned exposure in which many circular regions each having a size of 30 nm and being spaced apart to each other by 50 nm in a center-to-center distance are regularly arranged. The resist is then subjected to development using ethanol. The SiO$_2$ film is etched with hydrofluoric acid, and the resist is removed with chloroform, thereby forming many pits each having a size of 30 nm and a depth of 20 nm in the SiO$_2$ film. An organic dye molecule represented by the chemical formula (P-E1) and exhibiting crystalline-amorphous transition is vacuum-deposited, the surface is heated for two hours at 140° C. in a nitrogen atmosphere. Then, the silicon wafer is polished at room temperature using silica particles having a size of 100 nm so as to leave the organic dye molecule selectively in the pits, thereby forming recording domains consisting of the organic dye molecule. Thereafter, a protective film made of polyimide having a thickness of 20 nm is formed. In this case, the organic dye molecules are assumed to be in a crystalline state.

Using the apparatus shown in FIG. 5, recording and reproducing are performed. The recording domains are turned into an amorphous state, and then the recording medium is left to stand for one week at 80° C. When the intensity of reflected light is measured, there is no change in the intensity, which shows that thus confirming the amorphous state of the recording domains is maintained stably.

Example 15

An SiO$_2$ film having a thickness of 200 nm is deposited as an inorganic material film on a mirror-polished surface of a glass disk having a diameter of 120 mm and a thickness of 1.2 mm. Thereafter, polydiisobutyl fumarate as an electron beam resist is spin-coated on the SiO$_2$ film in a thickness of 40 nm. The resist is then irradiated with an electron beam by making use of an electron beam printing system so as to perform patterned exposure in which many circular regions each having a size of 30 nm and being spaced apart by 50 nm to each other in a center-to-center distance are regularly arranged. The resist is then subjected to development using ethanol. The SiO$_2$ film is etched with hydrofluoric acid, and the resist is removed with chloroform, thereby forming many pits each having a size of 30 nm and a depth of 20 nm in the SiO$_2$ film. A photochromic compound represented by the chemical formula (C-E1) and cholic acid exhibiting a transparent amorphous state are codeposited, and then is heated for two hours at 140° C. in a nitrogen atmosphere. Then, the silicon wafer is polished at room temperature using silica particles having a size of 100 nm so as to leave the organic dye molecules selectively in the pits, thereby forming recording domains. Thereafter, a polyimide film having a thickness of 100 nm is formed as a protective film.

When the absorption intensity of the recording signal is measured by means of NSOM, the signal intensity ratio between the recorded domains and the non-recorded domains is found to be 11.

Comparative Example 7

An SiO$_2$ film having a thickness of 200 nm is deposited as an inorganic material film on a mirror-polished surface of a glass disk having a diameter of 120 mm and a thickness of 1.2 mm by sputtering. Thereafter, a photochromic compound represented by the chemical formula (C-E1) and cholic acid exhibiting a transparent amorphous state are codeposited on the SiO$_2$ film. It is confirmed from AFM observation that a uniform film comprising cholic acid and the photochromic compound dispersed therein is formed on the SiO$_2$ film. Further, a protective film consisting of a polyimide film having a thickness of 100 nm is formed.

When the absorption intensity of the recording signal is measured by means of NSOM, the signal noise is increased as compared with that of Example 15, and the signal intensity ratio between the recorded domains and the non-recorded domains is found to be 6.

Example 16

Figure 8:
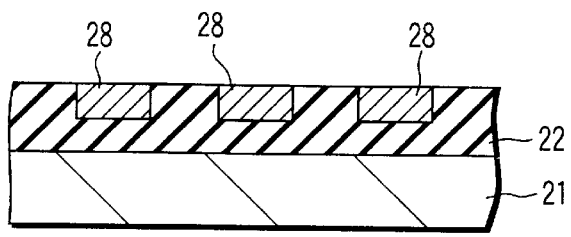
FIG. 8 is a cross-sectional view of the recording medium according to Example 16.

FIG. 8 shows a cross-sectional view of the recording medium in this example. The recording medium can be manufactured by the following method.

An SiO$_2$ film 22 having a thickness of 300 nm is deposited on a silicon wafer having a size of 3 inches and a thickness of 1.2 mm. Thereafter, polydiisobutyl fumarate as an electron beam resist is spin-coated on the SiO$_2$ film 22 in a thickness of 40 nm. The resist is then irradiated with an electron beam by making use of an electron beam printing system so as to perform patterned exposure in which many circular regions each having a size of 30 nm and being spaced apart by 50 nm in a center-to-center distance are regulary arranged. The resist is then subjected to development using ethanol. The SiO$_2$ film is etched with hydrofluoric acid, and the resist is removed with chloroform, thereby forming many pits each having a size of 40 nm and a depth of 40 nm in the SiO$_2$ film. An acceptor organic dye molecule represented by the chemical formula (Alq$_3$) is vacuum-deposited, and then is heated for one hour at 80° C. in a nitrogen atmosphere. Then, the SiO$_2$ film 22 is polished at room temperature using silica particles having a size of 100 nm so as to leave the organic dye molecules selectively in the pits, thereby forming recording domains 28 consisting of the organic dye molecules.

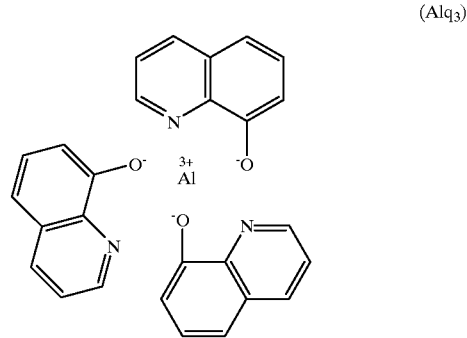

(Alq$_3$)

With respect to the recording medium thus obtained, recording is performed by injecting electrons into the recording domains by means of an AFM probe coated with Au under an applied voltage of 20V. It is confirmed from the fluorescence intensity measurement by means of NSOM that the fluorescence intensity of the recorded domains is decreased by 40% due to electron-injection.

The recording medium is left to stand for one week at 100° C. When the recording medium is observed by means of AMF, there is no change in the shape of the recording domains and 98% of the injected electric charges are retained. Further, the fluorescence intensity of the recording domains is almost the same as that measured immediately after the electron-injection (recording).

Example 17

A recording medium is manufactured in the same manner as in Example 1 excepting that the patterned exposure is performed such that many circular regions each having a size of 30 nm and being spaced apart by 35 nm in a center-to-center distance are regularly arranged.

Figure 9:
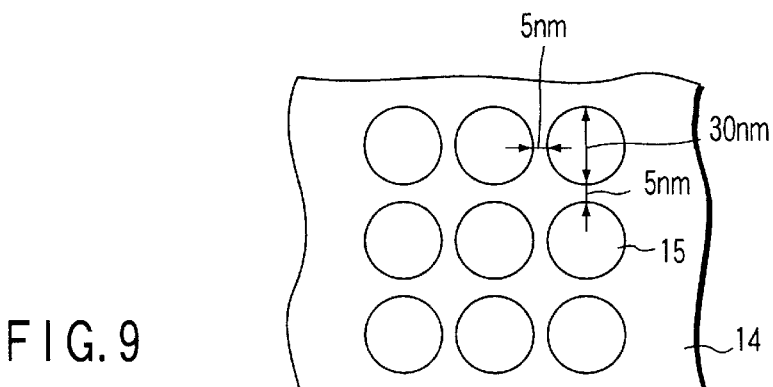
FIG. 9 is a plan view of the recording medium according to Example 17.

It is confirmed from AFM observation that dot-like recording domains 15 consisting of the organic dye molecules are formed closely and periodically on the disk as shown in FIG. 9. After holes are injected by means of an AFM probe coated with Au into the recording domains 15 under an applied voltage of 30V, the recording medium is left to stand for one week at 80° C. When the recording medium is observed by means of AMF, no change is recognized in the shape of the recording domains 15, and 95% of the injected electric charges are retained. It is possible with this recording medium to reduce write error rate to about 50% of that of the recording medium of Example 1.

Example 18

An Al film 12 having a thickness of 200 nm is vacuum-deposited on a mirror-polished surface of a glass disk 11 having a diameter of 120 mm and a thickness of 1.2 mm. Then, an $SiO_2$ film having a thickness of 200 nm is deposited as a hydrophilic insulating film 13 on the Al film 12 by sputtering. Thereafter, hydrophobic polydiisobutyl fumarate as an electron beam resist is spin-coated on the $SiO_2$ film in a thickness of 30 nm. The resist is then irradiated with an electron beam by making use of an electron beam printing system so as to perform patterned exposure in which many circular regions each having a size of 10 nm and being spaced apart to each other by 13 nm in a center-to-center distance are regularly arranged. In this case, the irradiation of the electron beam is interrupted once in every ten times so as to make a recording region for use in the control of signal. The resist is then subjected to development using ethanol, thereby exposing the $SiO_2$ film. The remained resist is employed as an isolation region 14. A donor organic dye molecule represented by the chemical formula (D-E1) is vacuum-deposited, and then is heated for one hour at 80° C. in a nitrogen atmosphere, thereby allowing the organic dye molecules to be self-aggregated selectively on the exposed $SiO_2$ film regions. Then, electron beam is irradiated to the recording region for use in signal controlling and development is performed so as to form pits 19.

Figure 10:
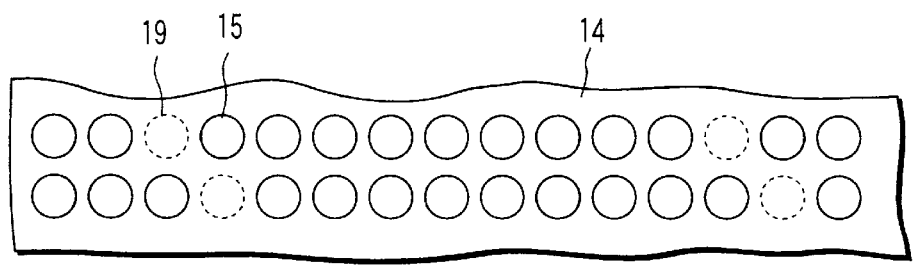
FIG. 10 is a plan view of the recording medium according to Example 18.

It is confirmed from AFM observation that the recording domains 15 consisting of the organic dye molecule and the signal controlling regions 19 are arranged as shown in FIG. 10. Since the reflection intensity of the signal controlling regions 19 differed from that of the other regions, by using reflection light as a control signal, it is possible to reduce error rates in reading and writing to about one tenth of that of the recording medium not provided with the signal controlling regions 19.

Example 19

An electron beam resist is coated on silicon substrate and then subjected to exposure using an electron beam printing system. After the resist is developed, the silicon substrate is etched, thereby preparing a stamp provided with many regularly arranged cylindrical protrusions each having a size of 30 nm and a height of 80 nm and being spaced apart to each other by 35 nm.

An Al film 12 having a thickness of 200 nm is vacuum-deposited on a mirror-polished surface of a glass disk 11 having a diameter of 120 mm and a thickness of 1.2 mm. Then, an $SiO_2$ film having a thickness of 200 nm is deposited as a hydrophilic insulating film 13 on the Al film 12 by sputtering. Thereafter, a donor organic dye molecule represented by the chemical formula (D-E1) is vacuum-deposited to a thickness of 80 nm on the $SiO_2$ film.

Then, the above stamp is pressed onto the organic dye molecule film at 80° C. After being cooled, the stamp is removed and the organic dye molecule film is etched using an oxygen plasma thereby selectively exposing the $SiO_2$ film at the regions on which the cylindrical protrusions are pressed. Thereafter, a polyimide film as an isolation region and a protective film is formed by means of deposition polymerization, thereby manufacturing a recording medium.

Example 20

An Al film 12 having a thickness of 200 nm is vacuum-deposited on a mirror-polished surface of a glass disk 11 having a diameter of 120 mm and a thickness of 1.2 mm. Then, an $SiO_2$ film having a thickness of 200 nm is deposited as a hydrophilic insulating film on the Al film 12. Thereafter, the $SiO_2$ film is treated with a fluorinated silane coupling agent so as to make the $SiO_2$ film hydrophobic. Then, a donor organic dye molecule represented by the chemical formula (D-E2) is vacuum-deposited. During the vapor deposition, the disk is cooled so as to suppress the quantity of the deposition. It is confirmed from AFM observation that the dot-like recording domains are regularly formed, each domain having a size of 4 nm and being spaced apart to each other by an average distance of 2 nm. Thereafter, a polyimide film as an isolation region and a protective film are formed by means of deposition polymerization, thereby manufacturing a recording medium.

Example 21

Figure 11:
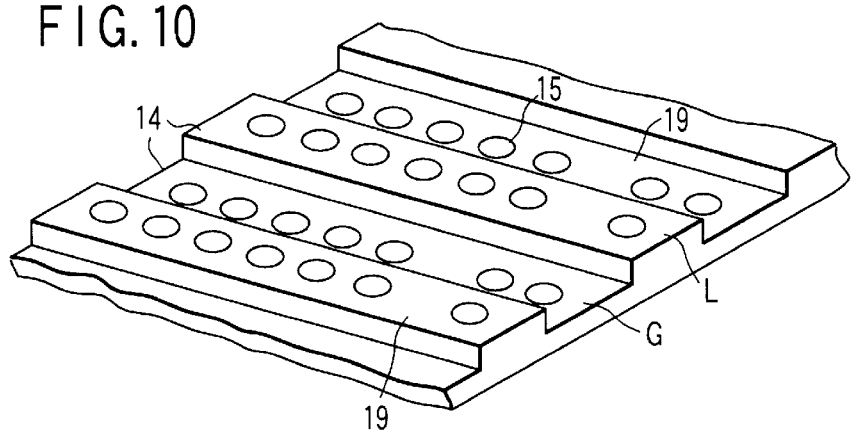
FIG. 11 is a perspective view showing the recording medium according to Example 21.

FIG. 11 shows a cross-sectional view of the recording medium in this example. This recording medium can be manufactured by the following method.

An electron beam resist is coated on a silicon substrate and then subjected to exposure using an electron beam printing system. After the resist is developed, the silicon substrate is etched, thereby preparing a stamp provided with a spiral groove having a width of 15 nm and a depth of 50 nm and being spaced apart to each other by 15 nm. Further, in the groove, many cylindrical protrusions each having a size of 10 nm and a height of 50 nm and being spaced apart to each other by 13 nm in a center-to-center distance are formed. Additionally, in the land, many cylindrical protrusions each having a size of 10 nm and a height of 20 nm and being spaced apart to each other by 13 nm in a center-to-center distance are formed. The protrusion is omitted in every ten protrusions, the omitted regions being utilized as signal controlling regions.

An $SiO_2$ film having a thickness of 200 nm is sputtered as a hydrophilic insulating film on a mirror-polished surface of a glass disk having a diameter of 120 mm and a thickness of 1.2 mm. Then, a hydrophobic polystyrene as a resist is spin-coated on the $SiO_2$ film in a thickness of 50 nm. Then, the above stamp, heated to 90° C., is pressed onto the polystyrene film. After being cooled, the stamp is removed and the polystyrene film is then etched using oxygen plasma, thereby selectively exposing the $SiO_2$ film at the regions on which the cylindrical protrusions are pressed. Thereafter, a donor organic dye molecule represented by the chemical formula (D-E1) is vacuum-deposited on the $SiO_2$ film in a thickness of 80 nm. Then, the organic dye molecule thus deposited is heated for one hour at 80° C. in a nitrogen atmosphere, thereby allowing the organic dye molecules to be self-aggregated selectively on the exposed $SiO_2$ film regions. Thereafter, a polyimide film as an isolation region 14 (and a protective film) is formed by deposition polymerization, thereby manufacturing a recording medium. According to this manufacturing method, the recording domains 15 and the signal controlling region 19 are formed along the land region L and the groove region G as shown in FIG. 11.

Example 22

A silicon substrate is coated with an electron beam resist, and then subjected to exposure using an electron beam printing system. After the resist is developed, the silicon substrate is etched thereby preparing a stamp provided with many cylindrical pits each having a size of 30 nm and a depth of 100 nm and being spaced apart to each other by 35 nm in a center-to-center distance.

An Al film having a thickness of 200 nm is vacuum-deposited on a mirror-polished surface of a glass disk having a diameter of 120 mm and a thickness of 1.2 mm. Then, an $SiO_2$ film having a thickness of 200 nm is deposited as a hydrophilic insulating film on the Al film by sputtering. Thereafter, a dispersion comprising polystyrene in which fullerene C70 and a donor organic dye molecule represented by the chemical formula (D-E1) are dispersed is spin-coated on $SiO_2$ film to obtain an organic dye molecule film having a thickness of 100 nm. Then, the stamp heated to 80° C. is pressed onto the organic dye molecule film. After being cooled, the stamp is removed, and the organic dye molecule film is etched using oxygen plasma thereby selectively exposing the $SiO_2$ film at the regions on which the surface region of the stamp other than the pits are pressed. Thereafter, a polyimide film as an isolation region and a protective film is formed by means of deposition polymerization, thereby manufacturing a recording medium.

Figure 12:
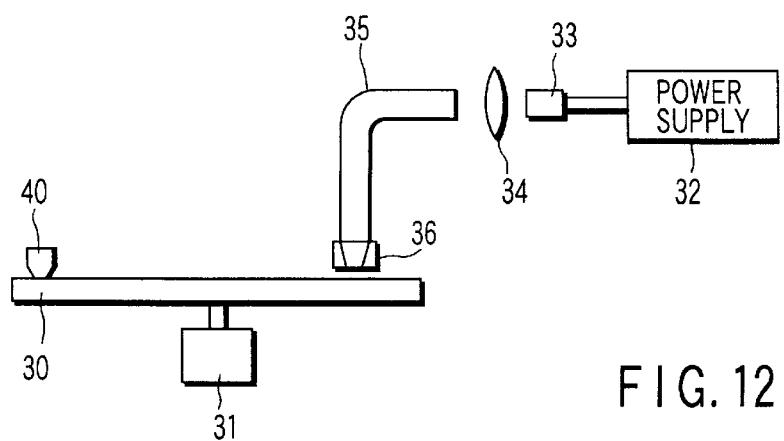
FIG. 12 is a schematic view illustrating the construction of the apparatus employed for recording, reproducing and erasing the recording medium according to Example 22.

FIG. 12 shows a recording/reproducing apparatus. A disk 30 is mounted on a spindle motor 31. The disk 30 is coated with a lubricating agent (not shown). A semiconductor laser 33 is operated by means of a power supply 32, the output thereof being variable. The beam emitted from the semiconductor laser 33 is transmitted via a lens 34 and an optical fiber 35 to the disk 30, thereby irradiating the disk 30. The optical fiber 35 is tapered such that the size of the opening region thereof is 10 nm. The distal end of the optical fiber 35 is secured by means of a mount 36, and the spacing between the distal end of the optical fiber and the disk 30 is kept to 20 nm. The information recorded in the disk 30 as injected electric charges is detected by a minute FET sensor 40 which is adapted to measure a change in electric potential.

Using the apparatus shown in FIG. 12, recording, reproducing and erasing of the recording medium are performed as follows. First, the disk 30 is rotated at a rate of 4,000 rpm by means of the motor 31. While maintaining the irradiation of a near-field beam, having a wavelength of 480 nm and an output of 2 mW, emitted from the semiconductor laser 33 and transmitted via the lens 34 and the optical fiber 35 to the disk 30, the mount 36 is actuated in radial direction of the disk, whereby the recording is performed spirally on the disk 30. As a result of this light irradiation, a separated electric charges are generated in the dot-like recording domains.

Then, a change in electric potential due to the separated electric charges is read out by the FET sensor 40. Thereafter, a near-field beam having an output of 7 mW is irradiated from the semiconductor laser 33 to the disk 30. Since the separated electric charges can be recombined by heat, it is possible to erase information.

Note that, even if the recording medium is left to stand for one week at 80° C., any substantial change is recognized in the separated electric charges, thus indicating the excellent stability.

Example 23

An SiC plate is worked to prepare a stamp provided with a regular pattern of protrusions each having a tip end size of about 3 nm and being spaced apart to each other by 13 nm.

An Al film having a thickness of 500 nm is vacuum-deposited on a mirror-polished surface of a glass disk having a diameter of 120 mm and a thickness of 1.2 mm. Then, the above stamp is pressed onto the Al film so as to form flaws of the protrusions in the Al film. Then, the Al film is subjected to anodic oxidation in an aqueous solution of dilute sulfuric acid. In this case, the oxidation is proceeded to form $Al_2O_3$ and, at the same time, the $Al_2O_3$ disposed around the flaws formed by the stamp is chemically etched. As a result, many pits, each having a size of 10 nm and depth of 20 nm and being spaced apart to each other by 13 nm in a center-to-center distance, are formed in the $Al_2O_3$ film having a thickness of 80 nm.

Thereafter, $Ge_2Sb_2Te_5$ (melting point: 600° C.) as an inorganic phase-change material is melted in vacuum and then charged into the pits in the $Al_2O_3$ film, thereby forming recording domains. Then, while being heated to 700° C., this disk is rotated at a rate of 200 rpm so as to remove an excessive recording material out of the pits by the effect of centrifugal force. Subsequently, a protective film 18 having a thickness of 10 nm is formed by ZnS—$SiO_2$ sputtering, thus manufacturing a recording medium.

Example 24

An Al film having a thickness of 200 nm is vacuum-deposited on a mirror-polished surface of a glass disk having a diameter of 120 mm and a thickness of 1.2 mm. Then, an $SiO_2$ film having a thickness of 200 nm is deposited as an inorganic material film on the Al film by sputtering. Thereafter, polydiisobutyl fumarate as an electron beam resist is spin-coated on the $SiO_2$ film in a thickness of 40 nm. The resist is then irradiated with an electron beam by making use of an electron beam printing system so as to perform patterned exposure in which many circular regions each having a size of 10 nm and being spaced apart to each other by 13 nm in a center-to-center distance are regularly arranged. In this case, the irradiation of the electron beam is interrupted once in every ten times so as to make signal controlling regions. After the resist is subjected to development using ethanol, the $SiO_2$ film is etched with hydrofluoric acid, and the resist is removed with chloroform, thereby forming many pits each having a size of 10 nm and a depth of 20 nm in the $SiO_2$ film. An organic dye molecule capable of causing crystalline-amorphous transition and represented by the chemical formula (P-E1) is vacuum-deposited, and then is heated for two hours at 140° C. in a nitrogen atmosphere. Then, the silicon wafer is polished at room temperature using silica particles having a size of 50 nm so as to leave the organic dye molecules selectively in the pits, thereby forming recording domains consisting of the organic dye molecules. Thereafter, a polyimide film having a thickness of 5 nm is formed as a protective film. In this case, the organic dye molecules are assumed as retaining a crystalline state.

Using the apparatus shown in FIG. 5, recording, reproducing and erasing of the recording medium are performed. Namely, after the recording domains are transformed into an amorphous state thereby performing recording, the recording medium is left to stand for one hour at 80° C. Then, the intensity of reflected light is measured, finding out no change in the intensity from that measured immediately after the recording, thus confirming an excellent stability of the amorphous state of the recording domains. Although the signal controlling regions 19 are the same in reflected light intensity as that of the isolation region, since the reflected light intensity of the signal controlling region 19 lasts for a long time, it can be recognized as controlling signals.

Example 25

An $SiO_2$ film having a thickness of 200 nm is sputtered on a mirror-polished surface of a glass disk having a diameter of 120 mm and a thickness of 1.2 mm. Then, an $SiO_2$ film having a thickness of 200 nm is sputtered as an inorganic material film on the Al film. Thereafter, $Ge_2Sb_2Te_5$ as an inorganic phase-change material is sputtered on the $SiO_2$ film in a thickness of 5 nm. Then, a donor organic dye molecule represented by the chemical formula (D-E2) is vacuum-deposited. During this vapor deposition, the disk is cooled so as to control the quantity of the deposition. It is confirmed from AFM observation that the dot-like regions are regularly formed, each having a size of 6 nm and being spaced apart to each other by an average distance of 1 nm. Thereafter, the $Ge_2Sb_2Te_5$ film is chemically etched with the dot-like regions consisting of the organic dye molecules being used as a resist mask thereby obtaining a $Ge_2Sb_2Te_5$ film pattern. It is confirmed from AFM observation that recording domains are regularly formed, each domain having a size of 5 nm and being spaced apart to each other by an average distance of 3 nm. Subsequently, a protective film having a thickness of 10 nm is formed by $ZnS$—$SiO_2$ sputtering, thus manufacturing a recording medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording medium comprising;

an inorganic material film formed on a substrate; and recording domains buried in said inorganic material film so as to form a predetermined pattern, each recording domain being made of a recording material selected from an organic dye molecule and an inorganic phase-change material, and having a size of 50 nm or less.

2. The recording medium according to claim 1, wherein said inorganic material film is made of $SiO_2$.

3. The recording medium according to claim 1, wherein said organic dye molecule is selected from the group consisting of an organic dye molecule capable of emitting fluorescence, an organic dye molecule exhibiting crystalline-amorphous transition, and an organic dye molecule exhibiting a photochromic property.

4. The recording medium according to claim 1, wherein the average distance between adjacent recording domains is not more than one third of the size of the recording domain.

5. The recording medium according to claim 1, wherein the size of each recording domain is 10 nm or less, and the average distance between adjacent recording domains is 3 nm or less.

6. The recording medium according to claim 1, further comprising a signal controlling region.

7. A method of manufacturing a recording medium, comprising the steps of:

forming an inorganic material film on a substrate;

forming pits in said inorganic material film so as to form a predetermined pattern;

filling said pits with a recording material selected from an organic dye molecule and an inorganic phase-change material; and removing an excessive recording material out of said pits.

8. The method according to claim 7, further comprising steps of coating said inorganic material film with a resist, exposing and developing the resist so as to form a resist pattern, and etching said inorganic material film by making use of the resist pattern as a mask, thereby forming pits arranged in a predetermined pattern.

9. The method according to claim 7, further comprising steps of forming a metal film on said inorganic material film, pressing to said metal film a stamp having patterned protrusions corresponding to the pattern of regions to be formed so as to make flaws on said metal film, and subjecting the metal film to oxidation and electrochemical etching at said flaws, thereby forming an inorganic material film having pits arranged in a predetermined pattern.

10. The method according to claim 7, further comprising a step of melting said recording material, followed by filling said pits with the melted recording material.

11. The method according to claim 7, further comprising steps of melting said recording material, followed by filling said pits with the melted recording material, and removing an excessive recording material by centrifugal force while rotating said substrate.

12. The method according to claim 7, further comprising steps of melting said recording material, followed by filling said pits with the melted recording material, cooling the recording material, and removing an excessive recording material by polishing the surface of said substrate.

* * * * *